United States Patent
Takagi et al.

(10) Patent No.: US 10,642,350 B2
(45) Date of Patent: May 5, 2020

(54) VIRTUAL IMAGE DISPLAY DEVICE

(71) Applicant: SEIKO EPSON CORPORATION, Tokyo (JP)

(72) Inventors: Masayuki Takagi, Azumino (JP); Akira Komatsu, Kamiina-gun (JP); Takashi Takeda, Suwa (JP); Toshiaki Miyao, Matsumoto (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/143,652

(22) Filed: Sep. 27, 2018

(65) Prior Publication Data
US 2019/0094550 A1    Mar. 28, 2019

(30) Foreign Application Priority Data

Sep. 28, 2017    (JP) ................ 2017-187592

(51) Int. Cl.
| | | |
|---|---|---|
| *G06F 3/01* | (2006.01) | |
| *G02B 27/01* | (2006.01) | |
| *G02F 1/1335* | (2006.01) | |
| *G06F 1/16* | (2006.01) | |

(52) U.S. Cl.
CPC ......... *G06F 3/012* (2013.01); *G02B 27/0172* (2013.01); *G02F 1/133514* (2013.01); *G06F 1/163* (2013.01); *G06F 3/011* (2013.01); *G02B 2027/0178* (2013.01)

(58) Field of Classification Search
CPC ........ G02B 27/0172; G02B 2027/0178; G02F 1/133514; G06F 3/012; G06F 1/163; G06F 3/011
See application file for complete search history.

(56) References Cited

U.S. PATENT DOCUMENTS

| | | | | |
|---|---|---|---|---|
| 5,701,132 | A * | 12/1997 | Kollin ................. | G02B 26/101 345/7 |
| 6,115,007 | A | 9/2000 | Yamazaki | |
| 2002/0167461 | A1* | 11/2002 | Bronson .............. | G02B 27/017 345/7 |
| 2004/0227703 | A1* | 11/2004 | Lamvik ............. | G02B 27/0172 345/76 |
| 2015/0339861 | A1* | 11/2015 | Yun ....................... | G06T 19/006 345/633 |

(Continued)

FOREIGN PATENT DOCUMENTS

JP    H10-123550 A    5/1998

*Primary Examiner* — Premal R Patel
(74) *Attorney, Agent, or Firm* — Oliff PLC

(57) ABSTRACT

An eyepiece optical system is configured to form a non-telecentric optical system together with an image display unit serving as an image element, and to include the pixels in which a pixel in a peripheral region and the like on an image display has a larger size than a pixel in a central region on the image display. Accordingly, the central region that supports a wide angle of view and is of the image display on the image element having an effective field of view with a good performance of information capacity, makes it possible to retain image formation with high resolution, and to prevent an image from being degraded in the peripheral region, thus making it possible to ensure high-quality visibility.

16 Claims, 17 Drawing Sheets

(56) References Cited

U.S. PATENT DOCUMENTS

| | | | |
|---|---|---|---|
| 2016/0041396 A1* | 2/2016 | Kawamura | G02B 27/0176 345/8 |
| 2016/0085075 A1* | 3/2016 | Cheng | G03B 21/00 359/631 |
| 2016/0162102 A1* | 6/2016 | Shahparnia | G06F 3/0416 345/174 |
| 2016/0240013 A1* | 8/2016 | Spitzer | G06F 3/013 |
| 2018/0045949 A1* | 2/2018 | Hua | G02B 5/04 |
| 2018/0090052 A1* | 3/2018 | Marsh | G09G 3/2092 |
| 2018/0103841 A1* | 4/2018 | Sprowl | A61B 3/0285 |
| 2018/0136720 A1* | 5/2018 | Spitzer | G02B 27/0093 |
| 2018/0137602 A1* | 5/2018 | Spitzer | G02B 27/2228 |

* cited by examiner

VIRTUAL IMAGE DISPLAY DEVICE

The present application is based on and claims priority from JP Application Serial Number 2017-187592, filed Sep. 28, 2017, the disclosure of which is hereby incorporated by reference herein in its entirety.

BACKGROUND

1. Technical Field

The disclosure relates to a virtual image display device to be mounted on the head of an observer to present an image formed by an image element and the like to the observer.

2. Related Art

In recent years, virtual image display devices, such as head-mounted displays to be mounted on the head of an observer (hereinafter, sometimes referred to as HMDs or head-mounted display devices), have been developed for a wide angle of view.

Incidentally, with regard to the human field of view, an effective field of view, in which performance of information capacity is good, is about 30° in the horizontal direction and about 20° in the vertical direction. Accordingly, it is considered that in the actually visible field of view, a range that allows information to be visually identified is about 30° at most. To ensure an excellent visibility while increasing an angle of view, it is important to retain a high resolution in this range.

There is a panel for an HMD known in the related art, which has pixel sizes gradually varying in the horizontal direction of the panel to correct a difference in visible size of pixel between the center and the periphery of the field of view on the panel due to a short distance between the eye and the panel disposed in front of the eye (JP-A-10-123550).

SUMMARY

The disclosure provides a virtual image display device capable of satisfying a wide angle of view and ensuring high-quality visibility.

A virtual image display device according to an aspect of the disclosure includes an image element in which a pixel in a peripheral region on an image display has a larger size than a pixel in a central region on the image display, and an eyepiece optical system disposed downstream of an optical path of the image element, the eyepiece optical system forming a non-telecentric system together with the image element to allow an image displayed by the image element to be viewed as a virtual image.

In the virtual image display device, the image element includes pixels such that a pixel in a peripheral region on an image display has a larger size than a pixel in a central region on the image display. In other words, a pixel in the center region has a relatively small size while a pixel in the peripheral region has a relatively large size. Thus, the central region of the image display corresponding to an effective field of view with a good performance of information capacity, of the human field of view, makes it possible to retain image formation with high resolution, while the peripheral region of the image display which provides a not as good performance of information capacity includes pixels with a large size, thus making it possible to support a wide angle of view. Furthermore, the eyepiece optical system that allows an image displayed by the image element to be viewed as a virtual image forms a non-telecentric system together with the image element, in other words, a main light beam is not parallel to an optical axis, and thus a small unit such as a micro display can be used as the image element. However, when a small unit is used as the image element, each pixel is also small and thus its characteristics of angle of view may not have a very wide range. In addition, a non-telecentric optical system has a large emission angle (telecentric angle) of a light beam particularly on the peripheral side (high image light side) of the image element, and thus an image may be degraded due to color mixing and the like. In contrast, large-sized pixels on the peripheral side can prevent an image from being degraded due to an increased emission angle of a light beam in the peripheral region of the image element, even when a non-telecentric optical system is utilized.

In a specific aspect of the disclosure, an optical surface of the eyepiece optical system may have a larger size than an image display region of the image element. This means that the size of the largest optical surface in the eyepiece system is larger than the size of the image display region. With that configuration, the non-telecentric optical system is of a divergent type, and thus an HMD, which tends to be constructed from some large-sized elements such as lenses so that the HMD has a wide angle of view, can be downsized or thinned as a whole.

In another aspect of the disclosure, the image element may be a micro display having an image display region with a side of 2.5 inches or less. With that configuration, the image element can be particularly downsized, and the production cost of the image element can be also reduced.

In another aspect of the disclosure, in the image element, the pixels may be arranged in an arrangement, in which a pixel size increases from a central side to a peripheral side of the image element, and a variation in the pixel size corresponds to a variation in an emission angle of a light beam emitted from the corresponding pixel. With that configuration, the emission angle is larger as the pixel is closer to the peripheral side, and accordingly, the size of the pixel increases. Thus, image degradation due to color mixing and the like can be avoided or prevented.

In another aspect of the disclosure, in the image element, the pixels may be arranged in an arrangement, in which a pixel size varies intermittently or continuously in a horizontal direction (left-and-right direction) corresponding to a direction of alignment of the eyes of an observer. With that configuration, particularly in the horizontal direction corresponding to the direction of alignment of the eyes of the observer, in which an effective field of view with a good performance of information capacity is wide, a wide angle of view can be achieved and an excellent visibility can be ensured.

In another aspect of the disclosure, in the image element, the pixels may be arranged in an arrangement, in which a pixel size varies intermittently or continuously in a vertical direction (up-and-down direction) perpendicular to the horizontal direction. With that configuration, also in the vertical direction perpendicular to the horizontal direction, a wide angle of view can be achieved and an excellent visibility can be ensured.

In another aspect of the disclosure, the pixels of the image element may be arranged in an arrangement, in which a pixel size varies but the pixels have an identical size according to a predetermined distance from a reference position in an image display region. With that configuration, in not only the horizontal direction (left- and right direction) and the vertical direction (up-and-down direction) perpendicular to the horizontal direction but also, for example, a diagonal direction, a wide angle of view can be achieved and an excellent visibility can be ensured.

In another aspect of the disclosure, in the image element, the pixels may be arranged in an arrangement, in which a pixel size that does not vary in a first display region having an angle of view of at least not greater than 10° and not less than −10° but varies in a second display region having a wider angle of view than the first display region. The field of view (FOV) includes angles of view in not only the horizontal direction and the vertical direction but also, for example, a diagonal direction, and the angle of view of at least not greater than 10° and not less than −10° means that any one of the angles of view above is not greater than 10° and not less than −10°. With that configuration, particularly in a range having an effective field of view with a good performance of information capacity, a high visibility can be ensured.

In another aspect of the disclosure, in the image element, in the horizontal direction, pixels that are arranged in a single line have an identical vertical size, and, in a vertical direction perpendicular to the horizontal direction, pixels that are arranged in a single line have an identical horizontal size. With that configuration of the image element, for example, when a panel including the pixels is used, each signal line can be wired straight, and thus the device with a relatively simple structure can be manufactured.

In another aspect of the disclosure, the image element may include color filter layers configured to transmit a light beam to be emitted, the color filter layers being arranged in an arrangement, in which a size increases from a central side to a peripheral side of the image element. With that configuration, color mixing in a color filter layer on the peripheral side can be reduced or avoided.

In another aspect of the disclosure, in the image element, a pixel may include a plurality of sub-pixels, at least one of the sub-pixels constituting a pixel corresponding to at least the central-side region having different lengths between a vertical direction and a horizontal direction, and, in an arrangement in a direction of a side with a smaller length of the sub-pixel between the lengths of the sub-pixel in the vertical direction and horizontal direction, the pixels are arranged in an arrangement, in which a length of the side with a smaller length of the sub-pixel increases from a central side to a peripheral side of the image element. With that configuration, in the direction of a smaller length of a sub-pixel, the closer to the peripheral side the sub-pixel, the larger the length of the sub-pixel, and thus image degradation can be prevented even for a large emission angle of a light beam.

In another aspect of the disclosure, in the image element, the pixels may be arranged to be symmetric in size with respect to a central position of an image display region as a reference position. With that configuration, an image balanced at the central position of the image display region as the reference position can be formed.

In another aspect of the disclosure, in the image element, the pixels may be arranged to be symmetric in size with respect to a position shifted from a central position of an image display region in a horizontal direction corresponding to a direction of alignment of the eyes of an observer, as a reference position. With that configuration, the reference position is a position shifted from the central position of the image display region in the horizontal direction corresponding to the direction of alignment of the eyes of an observer, and thus an image on the central side of image content can be displayed in high resolution, for example, in order to allow the observer to view a stereoscopic image with a parallax by both eyes.

In another aspect of the disclosure, the reference position may be shifted in the horizontal direction to set an angle of convergence at the eyes of the observer to from 0° to 2°. That configuration allows the observer to view a virtual image as if it is at a position away from a position of the observer by about 1 m. By further shifting the image with respect to the reference position in the left-and-right direction, the position of the virtual image can be adjusted from the position of about 1 m in the front-and-rear direction.

In another aspect of the invention, the image element and the eyepiece optical system may display an image with a maximum angle of view of 50° or greater. With that configuration, an image with a wide angle of view of 50° or greater in one of the horizontal direction, the vertical direction, and the like in the field of view (FOV) can be displayed.

In another aspect of the disclosure, the virtual image display device may have a head tracking function. With that configuration, content to be displayed follows the movement of the observer.

BRIEF DESCRIPTION OF THE DRAWINGS

Embodiments of the disclosure will be described with reference to the accompanying drawings, wherein like numbers reference like elements.

DESCRIPTION OF EXEMPLARY EMBODIMENTS

First Exemplary Embodiment

A virtual image display device according to First Exemplary Embodiment of the disclosure will be described in detail below with reference to FIG. 1 and the like.

Figure 1:
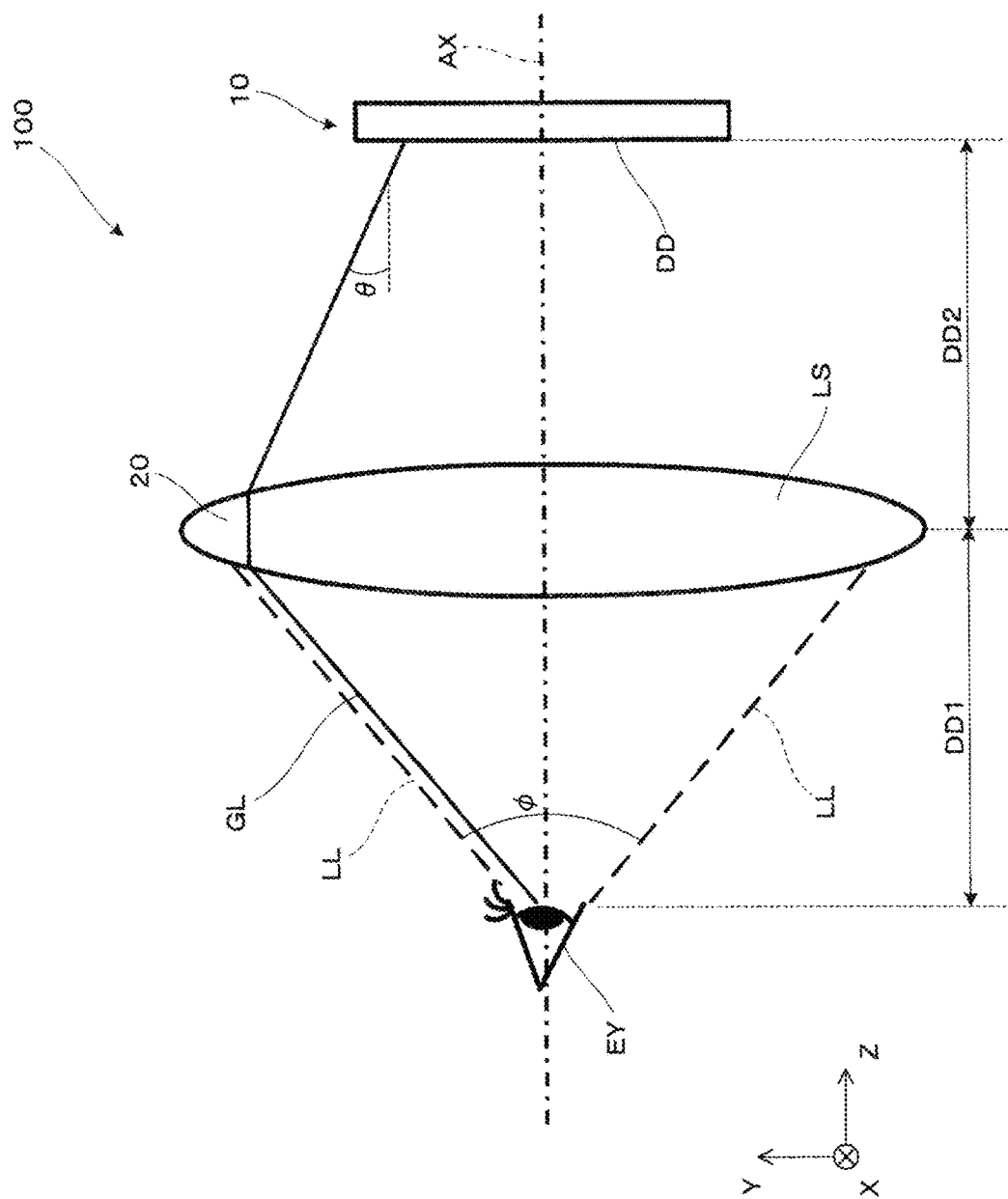
FIG. 1 is a cross-sectional view of a virtual image display device according to First Exemplary Embodiment for conceptually illustrating the virtual image display device.

As conceptually illustrated in FIG. 1, a virtual image display device 100 of First Exemplary Embodiment includes an image display unit 10 serving as an image element and an eyepiece optical system 20, and is a head-mounted display (HMD or head-mounted display device) that allows an observer or a user who wears the virtual image display device 100 to view image light of a virtual image. The image display unit 10 and the eyepiece optical system 20 are stored in and protected by an exterior member for covering the eyes of the observer, not illustrated, in a state where the virtual image display device 100 is worn. In the virtual image display device 100, an optical axis AX of the optical system is referred to as a Z direction. The optical axis AX passes through a central position CT of an image display region DD on the image display unit 10, and a large number of pixels included in the image display unit 10 are arranged to be symmetric in size with respect to the central position CT as a reference position. This arrangement enables the image display unit 10 to form an image balanced at the central position CT as the reference position. As illustrated, the Z direction is regarded as a direction along the directly forward direction of the observer, and the optical axis AX is an axis at which the angle of view (viewing angle) of the eye EY of the observer is 0°. The horizontal direction that is the direction of alignment of the left and right eyes EY of the observer is referred to as an X direction. In other words, the direction of alignment of the eyes EY, that is, the left-and-right direction, corresponds to the horizontal direction, and based on the definition of the direction, the virtual image display device 100 is constructed, and that direction illustrated is represented by the X direction. The up-and-down direction of the observer, which is perpendicular to the horizontal direction, is referred to as the vertical direction, which is represented by a Y direction in FIG. 1 and the like.

Next, an outline of an optical path of image light GL in the virtual image display device 100 is described. The image light GL emitted from the image display unit 10 reaches a position that is regarded as a location of the eye EY of the observer, through the eyepiece optical system 20.

An example of the structures and the like of elements for guiding the image light GL in the virtual image display device 100 is conceptually described below.

Figure 2A:
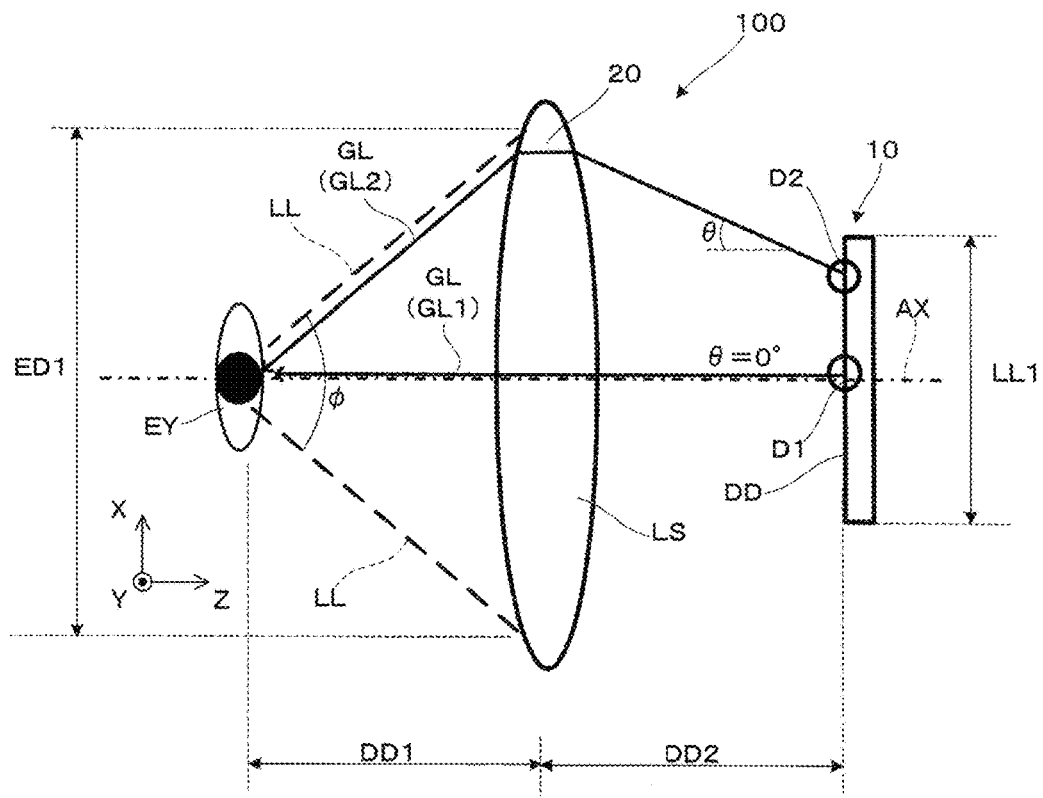
FIG. 2A illustrates an optical path in the virtual image display device in a horizontal plane.
Figure 3A:
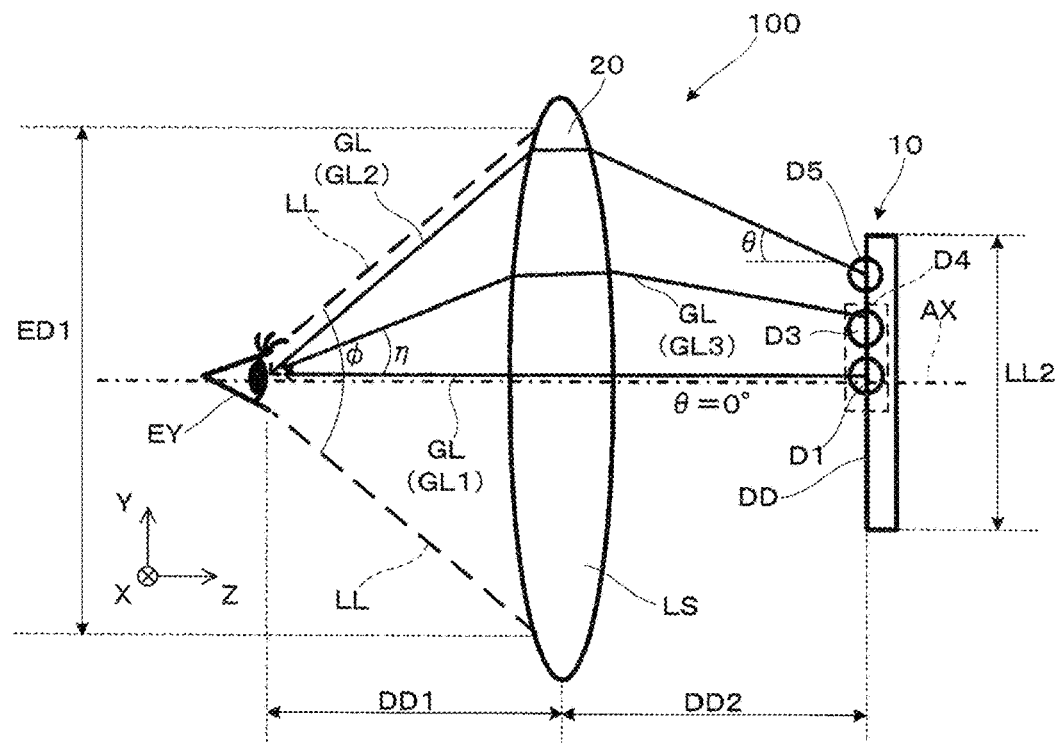
FIG. 3A illustrates an optical path in the virtual image display device in a vertical plane.

Of FIG. 1, FIG. 2A, and FIG. 3A, FIG. 1 and FIG. 3A each illustrate a cross-sectional view of the virtual image display device 100 in the optical axis AX, when viewed from the side in a state where the observer wears the virtual image display device 100, and FIG. 2A is a cross-sectional view of the virtual image display device 100 in the optical axis AX, when viewed from above in a state where the observer wears the virtual image display device 100. The image display unit 10 and the eyepiece optical system 20 are configured as a pair for each of the left eye and the right eye in the left-and-right direction, that is, the pairs are symmetrical, and one pair (for the left eye) is illustrated but the other is not. Specifically, in FIG. 1 and the like, the +X side corresponds to the outside (the ear side), and the −X side corresponds to the inside (the nose side). One of the symmetric pairs itself, i.e., stand-alone, functions as the virtual image display device. The virtual image display device may be configured for a single eye without the symmetric pairs as exemplified in FIG. 1, detailed description being omitted.

The image display unit 10 is an image element (an image display element or an image display section) for displaying an image. Specifically, the image display unit 10 serves as an image display section to form an image on a panel that is a part of the main body, convert the polarization state of the image light GL, which is the generated image light, as required, and emit the image light GL. The image display unit 10 may include a self light-emitting element (OLED) such as an organic electroluminescent element. The image display unit 10 may include an image element serving as a transmissive spatial light modulator or further include an illumination device (not illustrated) serving as a back light to illuminate the image element with illumination light and/or a drive controller (not illustrated) to control their operations. In First Exemplary Embodiment, the image display unit 10, which includes a large number of pixels to display an image, has a configuration such that a pixel located in a peripheral region on an image display has a larger size than a pixel located in a central region on the image display. (More detailed description is given with reference to FIG. 2B, FIG. 3B, or FIG. 4.) In one exemplary embodiment, the image display unit 10 may include, as a panel, a micro display having an image display region with a side of 2.5 inches or less. In another exemplary embodiment, the image display unit 10 may include, as a panel, a micro display having an image display region with a side of 1 inch or less.

The eyepiece optical system 20 is disposed, in an optical path of the image light GL, on the rear side of the optical path of the image display unit 10, that is, on the downstream side (the −Z side), and is also disposed in front of the eye of the observer in a worn state, to guide the image light GL from the image display unit 10 to the observer side. The eyepiece optical system 20 forms a non-telecentric system in which a main light beam is not parallel to an optical axis, together with the image display unit 10, and is also a magnification optical system that allows the observer to view an image displayed by the image display unit 10 as a magnified virtual image. In the example here, for simplification of explanation, the eyepiece optical system 20 includes a single lens LS. However, the eyepiece optical system 20 may include not only a single lens but also a plurality of lenses. Alternatively or additionally, the eyepiece optical system 20 may include a lens serving as a main element and other optical components such as a polarization converting member and a semi-transmissive polarizing plate to return a partial component of light. Other configuration examples will be described in detail later. The lens LS may be formed from a zero-birefringence resin lens or a low-birefringence resin lens, thus making it hard to cause birefringence.

In other words, the lens LS forming the eyepiece optical system 20 is an observer lens that is disposed to face a position regarded as the position of the eye EY of the observer. (This position is illustrated as the eye EY in the disclosure.) Specifically, the lens LS is a convex lens to collect the image light GL from the image display unit 10 and emit the image light GL to the front of the eye of the observer. The lens LS serves as an observer lens, that is, a lens disposed on the eye EY side of the observer, and is located away from the eye EY by a certain distance, which is a distance DD1 from 10 to 30 mm from the position regarded as the position of the eye EY of the observer to the lens LS. That configuration allows the observer to wear the virtual image display device 100 without feeling uncomfortable, like a glasses-type device. In particular, the distance DD1 is preferably in a range from 15 to 20 mm, which is a typical distance from the eye to the lens in normal glasses. The distance DD1 is in a standard range, independently of the image display unit 10, for a demand for a glasses-type device.

In contrast, a distance DD2 from the lens LS to the image display unit 10 is, for example, in a range from 20 to 50 mm, in optical design. In particular, when a small-sized panel is used in the image display unit 10 as in First Exemplary Embodiment, that distance is reduced, as compared to when a large-sized panel (referring to FIG. 16) is used. For example, the distance DD2 may be in a range from 20 to 30 mm. The distance DD2 may be in a range from about 0.1 mm to several tens of mm, other than the above range, depending on the arrangement of the lens LS and the like. An example of a magnitude relation in size between the image display unit 10 and the eyepiece optical system 20 (lens LS) is now described. Regarding the eyepiece optical system 20, an optical surface of the eyepiece optical system 20 has a larger size than an image display region of the image display unit 10. Specifically, for example, as illustrated in FIG. 2A and FIG. 3A, a lens effective diameter ED1 in the horizontal direction (the X direction) or the vertical direction (the Y direction), which corresponds to the size of the optical surface of the circular lens LS, is longer than lengths LL1 and LL2 of the panel, which correspond to the sizes of the image display region of the image display unit 10 in the horizontal direction (the X direction) or the vertical direction (the Y direction), respectively. Accordingly, the eyepiece optical system 20 illustrated is a divergent type of non-telecentric optical system in which the main light beam is spread (non-parallel) with respect to the optical axis as the main light beam is closer to the eyepiece optical system 20 from the image display unit 10. This makes it possible to reduce the entire image height. Specifically, this makes it possible to magnify an image on the image display unit 10 using a small-sized panel such as a micro display having side length LL1 or LL2 of 2.5 inches or less or 1 inch or less (more preferably, from about 12 to 13 mm), thus forming an image with a wide angle of view.

In general, virtual image display devices such as HMDs have been developed for a wide angle of view. For example, some virtual image display devices have a maximum angle of view (field of view or viewing angle) of greater than 50°. Likewise, the virtual image display device 100 of First Exemplary Embodiment is designed to have a maximum field of view of greater than 50°. In other words, a range of angle of view represented by broken lines LL in FIG. 1 and the like is sufficiently large as a visible range. In the case of First Exemplary Embodiment, the field of view, that is, a maximum angle of view (viewing angle) φ is determined depending on the arrangement, size, and the like of the image display unit 10 and the eyepiece optical system 20 (e.g., the distance DD1, the lens effective diameter ED1, and the like). However, such a non-telecentric optical system as in First Exemplary Embodiment makes the image display unit 10 small while making it easy to exert an influence on the configuration of the image display unit 10. For example, of the image light GL from the image display unit 10, a component of light GL1 emitted from the central region around the optical axis AX has an emission angle of a light beam (angle of main light beam) of 0° or a sufficiently small emission angle of a light beam, while a component of light GL2 emitted from the peripheral region away from the optical axis AX has a large light emission angle (angle of main light beam) θ, and may cause image degradation due to luminance unevenness or chromaticity unevenness.

On the other hand, with regard to the human field of view, an effective field of view with a good performance of information capacity is about 30° in the horizontal direction and about 20° in the vertical direction. Accordingly, in the actually visible field of view, a range that allows information to be visually identified is about 30° at most, and in view of ensuring an excellent visibility with a wide angle of view having been developed, it is significant that high resolution is retained in the region. Furthermore, unlike a normal direct viewing type of display (e.g., an FOV from about 20° to 30°) that requires high resolution over the entire region within an effective field of view with a good performance of information capacity, an HMD having a wide angle of view, for example, an FOV of greater than 50° as in First Exemplary Embodiment has often, for example, a known head tracking function. Thus, when the observer attempts to move the head, not the eyes, to view the surrounding region, the eyes of the observer are always directed to almost the center of an image but hardly directed to a peripheral region of the image. Therefore, in an image display, a region that requires higher resolution is limited to the central region on the image display, but the peripheral region does not require so high resolution.

In First Exemplary Embodiment, taking this view into account, the image display unit 10 is configured to include the pixels such that a pixel in the peripheral region on the image display has a larger size than a pixel in the central region of the image display. In other words, a pixel in the center region has a relatively small size while a pixel in the peripheral region has a relatively large size. Thus, the central region on the image display corresponding to an effective field of view with a good performance of information capacity, of the human field of view, retains image formation with high resolution, while the peripheral region on the image display, which provides a not as good performance of information capacity, has pixels with a large size, and thus makes it possible to satisfy a wide angle of view. In addition, even when the eyepiece optical system 20 utilizes a non-telecentric optical system, an image is prevented from being degraded due to an increased emission angle of a light beam in the peripheral region of the image display unit 10.

The head tracking function will be simply described as a modified example (referring to FIG. 13) which is an example of known head tracking. The First Exemplary Embodiment and also all the other exemplary embodiments may be configured to have the head tracking function.

An example of an arrangement of the pixels included in the image display unit 10 of First Exemplary Embodiment is described in detail below with reference to FIG. 2 to FIG. 4.

Figure 2B:
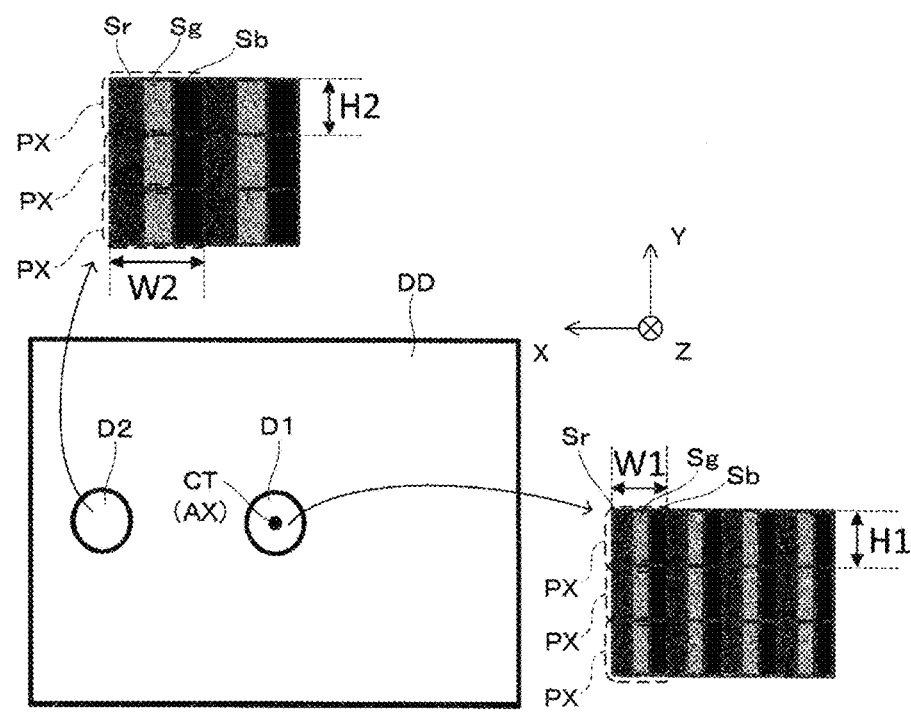
FIG. 2B illustrates a central region and a peripheral region in an image display.

As described above, FIG. 2A illustrates a cross-sectional view of the virtual image display device 100 in the optical axis AX, when viewed from above in a state where the observer wears the virtual image display device 100, and illustrates optical paths in the cross-sectional view in a plane including the optical axis AX in the horizontal direction (the X direction; the left-and-right direction). FIG. 2B illustrates the central region and the peripheral region on the image display in the horizontal direction, as associated with FIG. 2A. As illustrated, in the image display region DD which is a region on an image display of the virtual image display device 100, the component of light GL1 of the image light GL emitted from the central position CT through which the optical axis AX passes and a central region D1 around the central position CT has a light emission angle (angle of main light beam) of 0° (or almost 0°) with respect to the optical axis AX, while the component of light GL2 emitted from a peripheral region D2 away from the optical axis AX in the horizontal direction (the X direction) has a large light emission angle θ to a certain extent. To accord with this, a large number of pixels PX which constitute the image display unit 10 are arranged in matrix such that pixels on the peripheral side have a larger size. Specifically, as partially enlarged in FIG. 2B, each pixel PX includes three sub-pixels Sr, Sg, and Sb that are arranged in a line in the horizontal direction (the X direction), and pixels PX in the peripheral region D2 have a larger size than pixels PX in the central region D1. More specifically, the central region D1 includes a pixel PX having a shortest length (width) W1 in the X direction and a shortest length (height) H1 in the Y direction. In contrast, the peripheral region D2 includes a pixel PX having a length (width) W2 in the X direction that is longer than the length (width) W1 of the pixel PX in the central region D1 in the X direction. In other words, the length of the pixel PX in the peripheral region D2 in the X direction is longer than the length of the pixel PX in the central region D1 in the X direction. Furthermore, a variation in the length (width) of each pixel PX in the X direction is defined to have resolution required based on the characteristics of the human eye as described above and to correspond to a variation in an emission angle of a light beam depending on a difference in position between the pixels PX, that is, by taking into account the light emission angle θ and the characteristics of viewing angle of the sub-pixels Sr, Sg, and Sb which constitute each pixel PX, thus enabling the virtual image display device to have a wide angle of view and to ensure high-quality visibility.

As the example illustrated, for example, pixels PX from the central region D1 to the peripheral region D2 may vary intermittently such that their size increases to be identical in unit of several pixels, or may vary continuously such that their size gradually increases in unit of one pixel PX.

On the other hand, the length (height) H1 and a length (height) H2 of each pixel PX in the Y direction are identical in the central region D1 and the peripheral region D2 (and also the region therebetween), respectively. In other words, in the horizontal direction (the X direction), the pixels that are arranged in each line have an identical vertical size (height).

In the example illustrated, regarding the three sub-pixels Sr, Sg, and Sb which constitute each pixel PX, sub-pixels Sr, Sg, and Sb which constitute a pixel PX corresponding to at least the optical axis AX and the central region D1 around the optical axis AX each have different lengths between the vertical direction and the horizontal direction. More specifically, of the pixel PX in the central region D1, the size (width) in the horizontal direction (the X direction) is smaller than the size (height) in the vertical direction (the Y direction). In that configuration, with regard to the arrangement in the horizontal direction, which is a direction of a smaller length of the side, sub-pixels Sr, Sg, and Sb are arranged in an arrangement in which the size increases from the central side to the peripheral side. In this way, in the direction corresponding to a smaller length of each of the sub-pixels Sr, Sg, and Sb, the closer to the peripheral side the sub-pixel, the larger the length of the sub-pixel, and thus image degradation is prevented even for a large emission angle of a light beam.

Figure 3B:
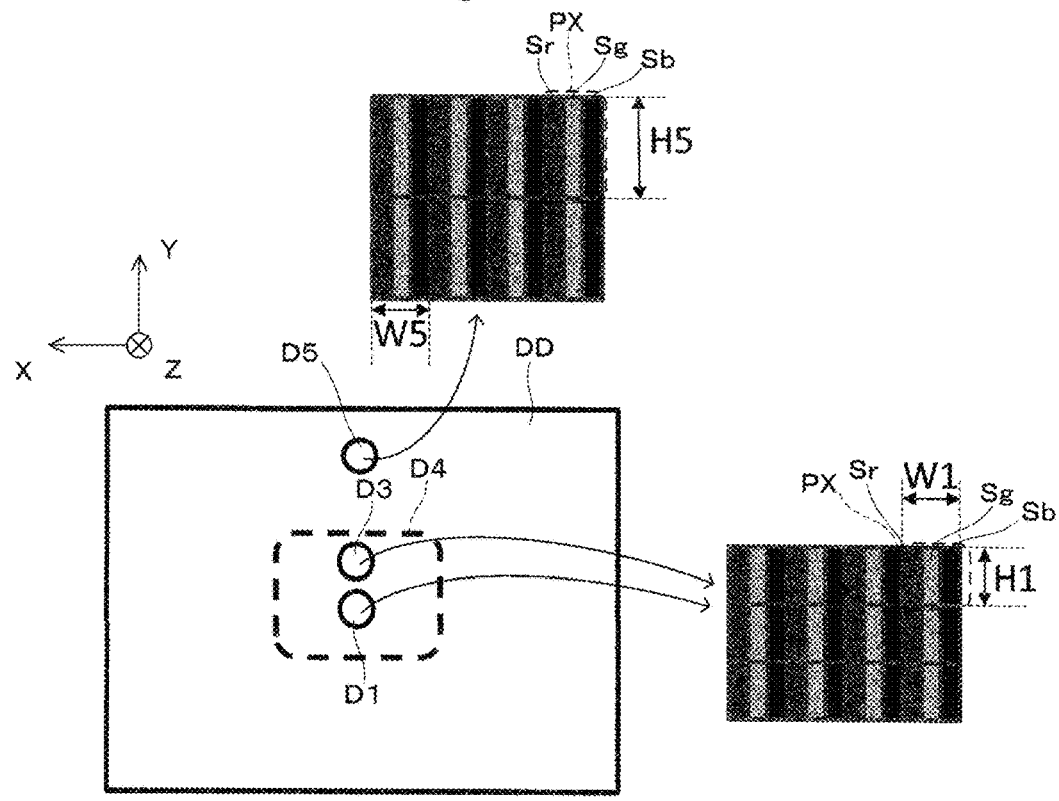
FIG. 3B illustrates the central region and the peripheral region in the image display.

Next, as described above, FIG. 3A illustrates a cross-sectional view of the virtual image display device 100 in the optical axis AX, when viewed from the side in a state where the observer wears the virtual image display device 100, and illustrates optical paths in the cross-sectional view in a plane including the optical axis AX in the vertical direction (the Y direction; the up-and-down direction). FIG. 3B illustrates the central region and the peripheral region on the image display in the vertical direction, as associated with FIG. 3A. As illustrated, in the image display region DD which is a region on an image display of the image display unit 10, the component of light GL1 of the image light GL emitted from the optical axis AX and the central region D1 around the optical axis AX has a light emission angle (angle of main light beam) θ of 0° (or almost 0°) with respect to the optical axis AX, while the component of light GL2 emitted from a peripheral region D5 away from the optical axis AX in the vertical direction (the Y direction) has a large light emission angle θ to a certain extent. In the example described here, as an intermediate region between the regions D1 and D5, a component of light GL3 emitted from a region D3 slightly away from the optical axis AX in the vertical direction (the Y direction) is also examined. In the case illustrated, a half angle of view η corresponding to the component of light GL3 is 10°. (In other words, it corresponds to the angle of view φ of ±10°, i.e., 20°.) Also in this case, a large number of pixels PX which constitute the image display unit 10 are arranged in matrix such that pixels on the peripheral side each have a larger size. However, the pixels are arranged in an arrangement, in which a pixel size does not vary in a region D4 that includes not only the central region D1 at almost 0° in the angle of view φ but also, for example, the region D3 having a full angle of view of not greater than 10° and not less than −10°, but varies in a display region having a larger angle of view than the display region D4. More specifically, as partially enlarged in FIG. 3B, the display region D4 that includes not only the central region D1 but also the region D3 includes pixels PX having the shortest length (width) W1 in the X direction and the shortest length (height) H1 in the Y direction. In contrast, the peripheral region D5 includes pixels PX having a length (height) H5 in the Y direction that is longer than the length (height) H1 of pixel PX of the central region D1 in the X direction. In other words, the length of pixel PX of the display region D4 including the central region D1 in the Y direction is longer than the length of pixel PX of the central region D1 in the Y direction. As in the display region D4, a range of an effective field of view with a good performance of information capacity, which retains high resolution, makes it possible to give an excellent visibility to a person having an angle of view φ of about ±10°. Taking into account that the human field of view has an effective field of view with a good performance of information capacity, defined by about 30° in the horizontal direction and about 20° in the vertical direction, for example, the half angle of view η of the above parameters may be about 15°, in other words, the angle of view φ may be about ±15° (30°).

On the other hand, the lengths (widths) W1 and W5 of each pixel PX in the X direction are identical in the display region D4 including the central region D1, and in the peripheral region D5 (and also the region therebetween). In other words, in the vertical direction (the Y direction), the pixels that are arranged in each line have an identical horizontal size (width).

As described above, also in the horizontal direction (the X direction), the pixels that are arranged in a single line have an identical vertical size (height). In this way, the image display unit 10 includes pixels PX with an identical vertical size that are arranged in a single line in the horizontal direction, and pixels PX with an identical horizontal size that are arranged in a single line in the vertical direction perpendicular to the horizontal direction. With that configuration of the image display unit 10, each signal line applied when a panel including the pixels is used can be wired straight, and thus the image display unit 10 with a relatively simple structure can be manufactured.

Figure 4:
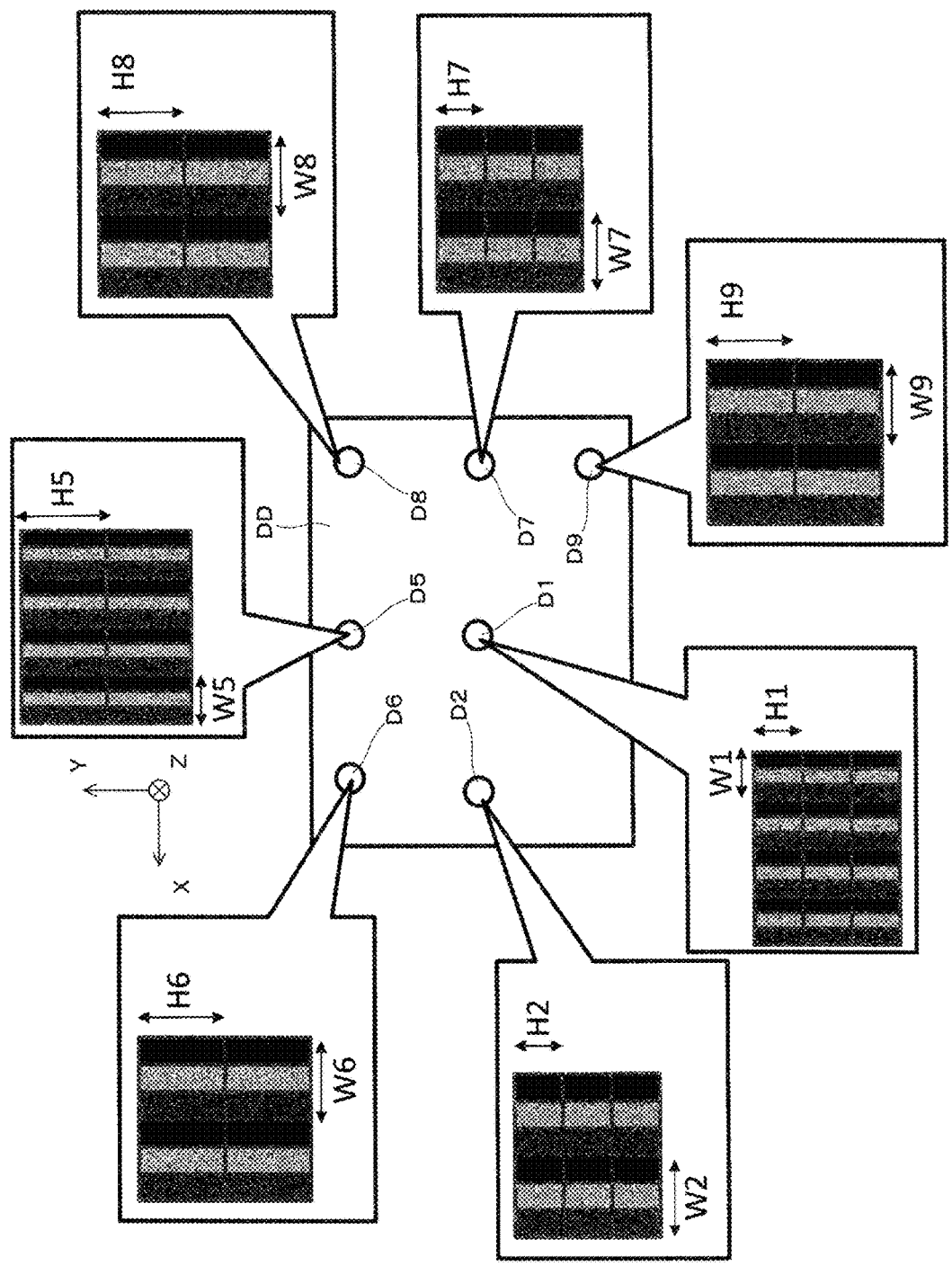
FIG. 4 illustrates the entire image display region on an image element.

FIG. 4 illustrates the entire image display region DD in the configuration as described above. In that configuration, as described above, the central region D1 and a region that includes the central region D1 and is relatively close to the central side, include pixels having the shortest width W1 and the shortest height H1. In contrast, in the horizontal direction (the X direction), the peripheral region D2 includes pixels having the width W2 longer than the width W1, and a peripheral region D7 includes pixels having a width W7 longer than the width W1. In the vertical direction (the Y direction), the peripheral region D5 includes pixels having a height H5 longer than the width H1. In both the horizontal direction (the X direction) and the vertical direction (the Y direction), a peripheral region D6, a peripheral region D8, and a peripheral region D9 include pixels each having a width W6, a width W8, and a width W9, which are each longer than the width W1, and a height H6, a height H8, and a height H9, which are each longer than the height H1, respectively. Regarding other peripheral regions whose partial description is omitted above, a peripheral region on the lower side (the −Y side) in the central region D1 is like the peripheral region D5, and a peripheral region on the lower left side (the +X side and the −Y side) in the central region D1 is like the peripheral regions D6, D8, and D9.

A degree by which the width W2 and the height H5 are longer than the width W1 and the height H1, respectively, may be set to any value, for example, almost twice, i.e., W2=2×W1 approximately, H5=2×H1 approximately.

As described above, in First Exemplary Embodiment, the pixels PX of the image display unit 10 are arranged to be symmetric in variation of size with respect to a central position of the image display region DD as a reference position.

Avoidance of problems such as color mixing in the image display unit 10 is described below with reference to FIG. 5 and the like.

To begin with, a configuration example of the image display unit 10 including a self light-emitting element (OLED) such as an organic electroluminescent element is described. In the drawings, in the image display unit 10, a section corresponding to a central region on an image display is referred to as an image display section 10*a*, and a section corresponding to a peripheral region on the image display is referred to as an image display section 10*b*.

Figure 5:
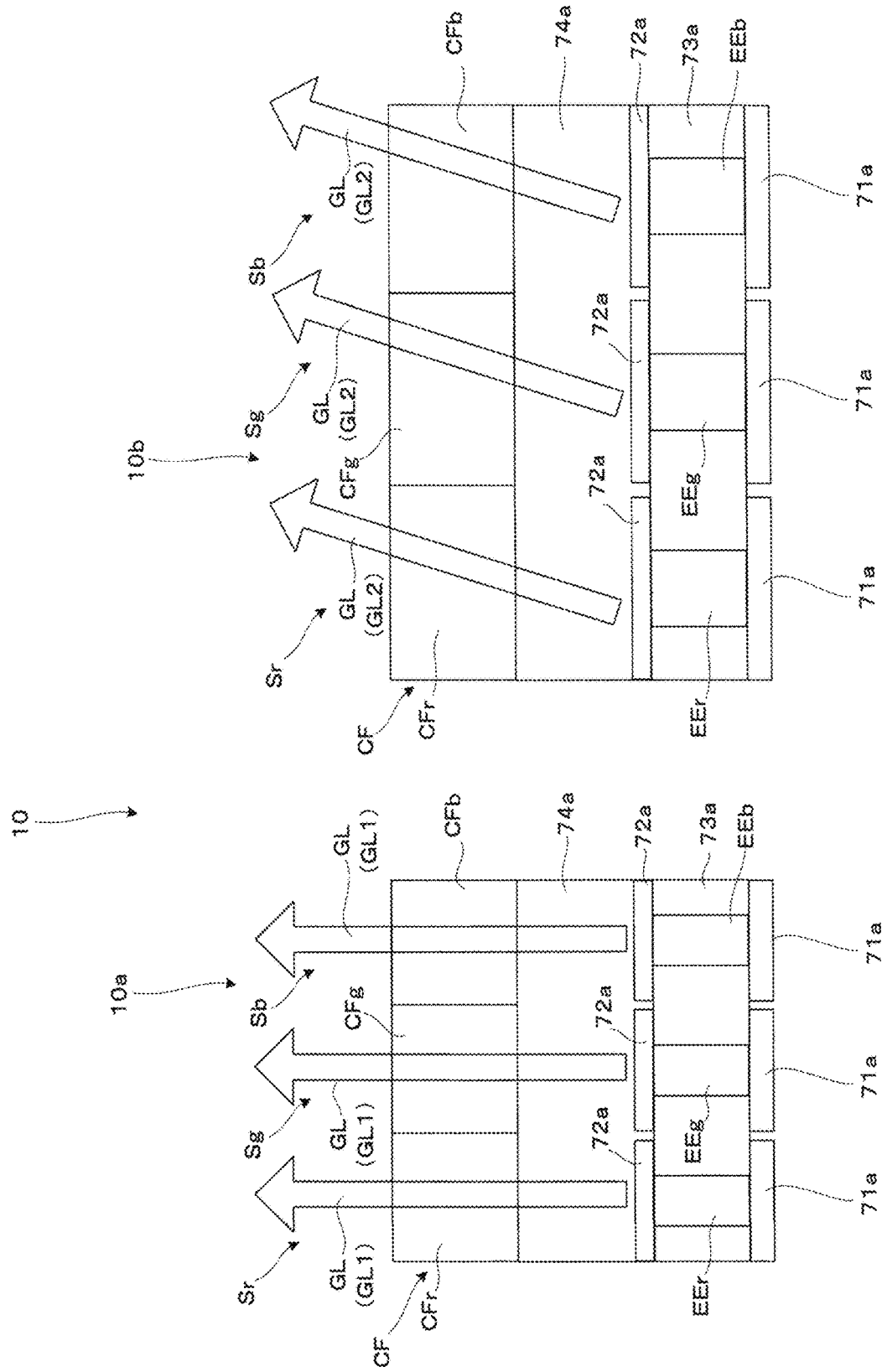
FIG. 5 is a cross-sectional view of the image element for conceptually illustrating emission of light beams.

The image display unit 10 (or the image display sections 10*a* and 10*b*) exemplified in FIG. 5 includes a color filter CF, a plurality of transparent electrodes (positive electrodes) 71*a* each serving as a pixel electrode, a counter electrode (negative electrode) 72*a*, an organic EL layer 73*a* that includes light emitting layers EEr, EEg, and EEb for respective colors and serves as a light emitting functional layer interposed between the transparent electrodes 71*a* and the counter electrode 72*a*, and a protective layer 74*a*. The color filter CF is formed on the protective layer 74*a*. The color filter CF includes color filter portions CFr, CFg, and CFb for red, green, and blue, respectively. The color filter portions CFr, CFg, and CFb for the respective colors are arranged in matrix to correspond to the plurality of transparent electrodes (positive electrodes) 71*a* each serving as a pixel electrode. With that configuration, the image display unit 10 drives the electrodes 71*a* and 72*a* as appropriate to cause the organic EL layer 73*a* including the light emitting layers EEr, EEg, and EEb to emit light, thus emitting the image light GL (or the components of light GL1 and GL2 of the image light GL).

The image display section 10*a* that constitutes the central region and the image display section 10*b* that constitutes the peripheral region differ in size depending on the size of the corresponding pixel PX (the sub-pixels Sr, Sg, and Sb). In other words, the image display section 10*b* is larger in size of parts constituting each pixel PX than the image display section 10*a*. In the example illustrated, as the size of the pixel PX increases, the size of the corresponding light emitting layers EEr, EEg, and EEb for the respective colors increases.

The image display section 10*a* emits the component of light GL1 to be a light beam from the central region. The component of light GL1 emitted from the image display section 10*a* has a relatively small angle of main light beam. Thus, for example, even when the characteristics of viewing angle indicate a relatively narrow, "peaky curve", it is difficult to cause reduction in luminance and change in color. On the other hand, the image display section 10*b* emits the component of light GL2 to be a light beam from the peripheral region. The component of light GL2 emitted from the image display section 10*b* has a relatively large angle of main light beam. As described above in the disclosure, to accord with this, the corresponding pixel has a large size. Specifically, the color filter portions CFr, CFg, and CFb which constitute the image display section 10*b* are larger than those of the image display section 10*a*. Therefore, the characteristics of viewing angle indicate a relatively wide curve, thus making it possible to keep reduction in luminance and change in color to a minimum.

Figure 6:
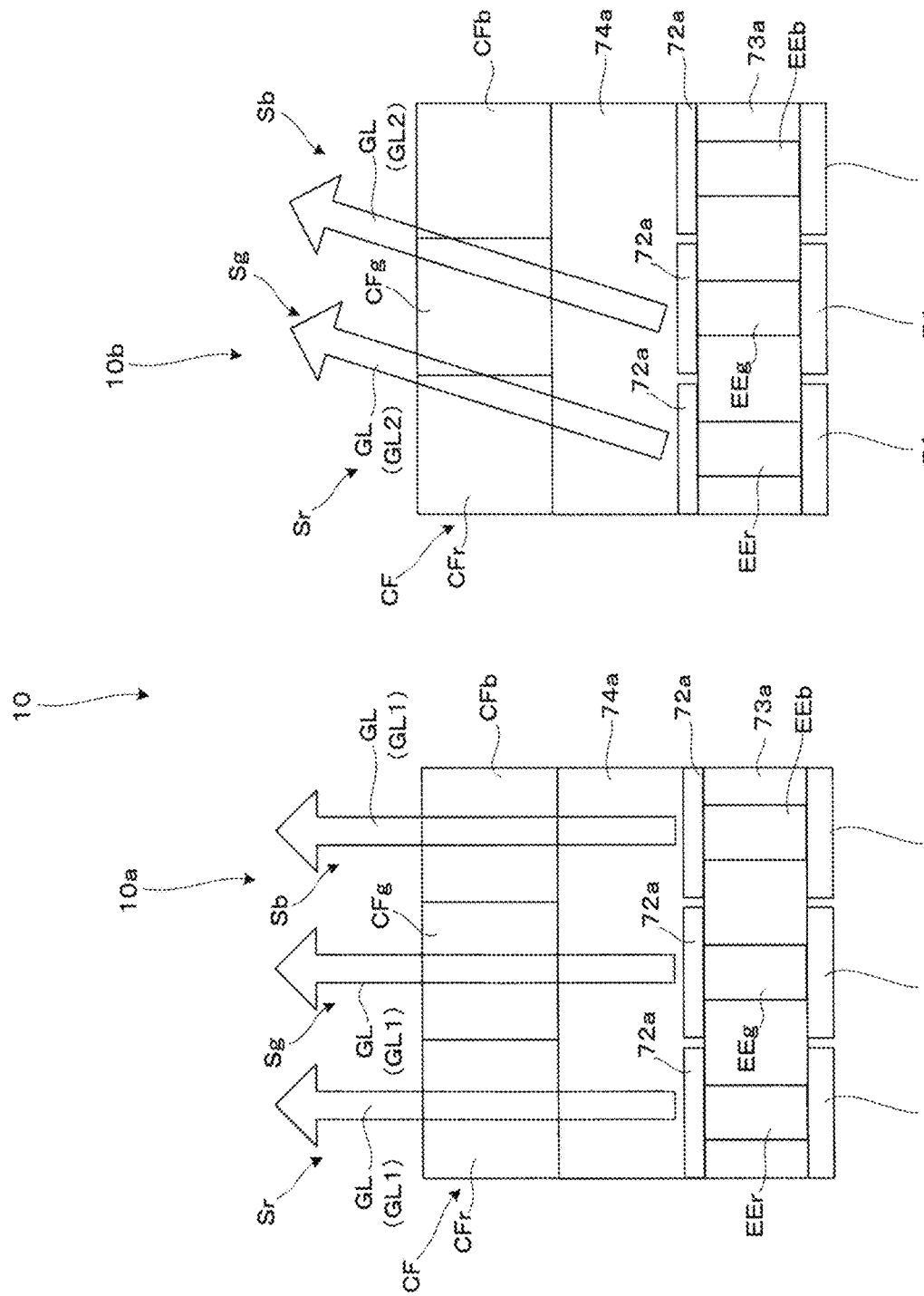
FIG. 6 is a view of a comparative example of an image element for conceptually illustrating emission of light beams.

FIG. 6 illustrates a comparative example of the image display unit 10 to FIG. 5. The pixels in the comparative example of the image display unit 10 have an identical size. Specifically, the image display section 10*a* that constitutes the central region and the image display section 10*b* that constitutes the peripheral region are the same in size of pixel. In this case, the image display section 10*a* that constitutes the central region causes no problem because of a relatively small angle of main light beam, but the image display section 10*b* that constitutes the peripheral region causes a problem of color mixing because of a relatively large angle of main light beam. For example, as illustrated, in the image display section 10*b*, there is a possibility that the component of light GL2 emitted from the light emitting layer EEr corresponding to a red light beam passes through not only the color filter portion CFr for a red light beam to be properly passed but also the color filter portion CFg for a green light beam. This causes reduction in luminance and change in color, that is, problems of color mixing and the like. First Exemplary Embodiment makes it possible to avoid or reduce such incidents.

As described above, in First Exemplary Embodiment, the eyepiece optical system 20 utilizes a non-telecentric optical system, and the image display unit 10 is configured to include the pixels PX such that a pixel PX in the peripheral region D2 and the like on the image display has a larger size than a pixel PX in the central region D1 on the image display. The central region that supports a wide angle of view and is on the image display of the image element having an effective field of view with a good performance of information capacity makes it possible to retain image formation with high resolution, and to prevent an image from being degraded in the peripheral region, thus making it possible to ensure high-quality visibility.

Figure 7A:
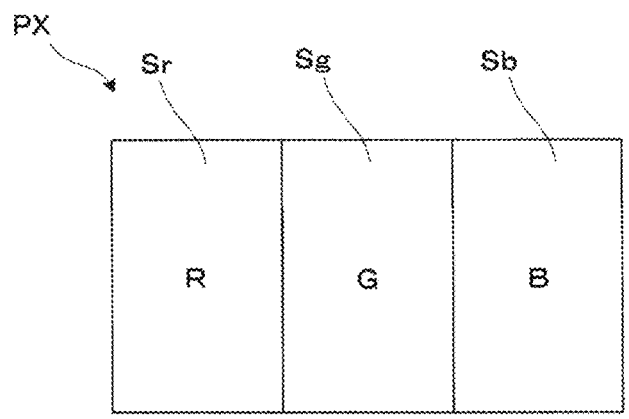
FIG. 7A is a plan view of sub-pixels constituting a pixel for conceptually illustrating an example.
Figure 7B:
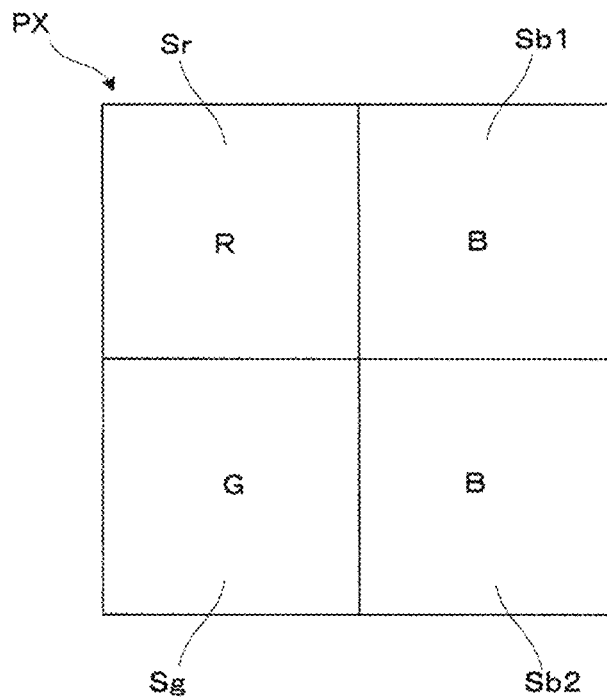
FIG. 7B is a plan view of sub-pixels constituting a pixel for conceptually illustrating another example.

In the example described above, for example, as illustrated in FIG. 7A, the single pixel PX is composed of the three sub-pixels Sr, Sg, and Sb that are arranged in a row (in a line in the horizontal direction) to form three colors of R, G, and B (red, green, and blue). However, as another example illustrated in FIG. 7B, the single pixel PX may be composed of four sub-pixels Sr, Sg, Sb1, and Sb2 in square array. For example, as the example described above, the image display unit 10, when including OLEDs, is configured to include two sub-pixels for blue (B) Sb1 and Sb2, thus prolonging the lifetime of the device. The three sub-pixels Sr, Sg, and Sb for R, G, and B (red, green, and blue) may be arranged in a column (in a line in the vertical direction).

Second Exemplary Embodiment

A virtual image display device according to Second Exemplary Embodiment will be described below with reference to FIG. 8. The virtual image display device according to Second Exemplary Embodiment is almost the same as the case of First Exemplary Embodiment, except for the arrangement of pixels included in an image display unit, and thus illustration and description of the entire configuration and the like are omitted.

Figure 8:
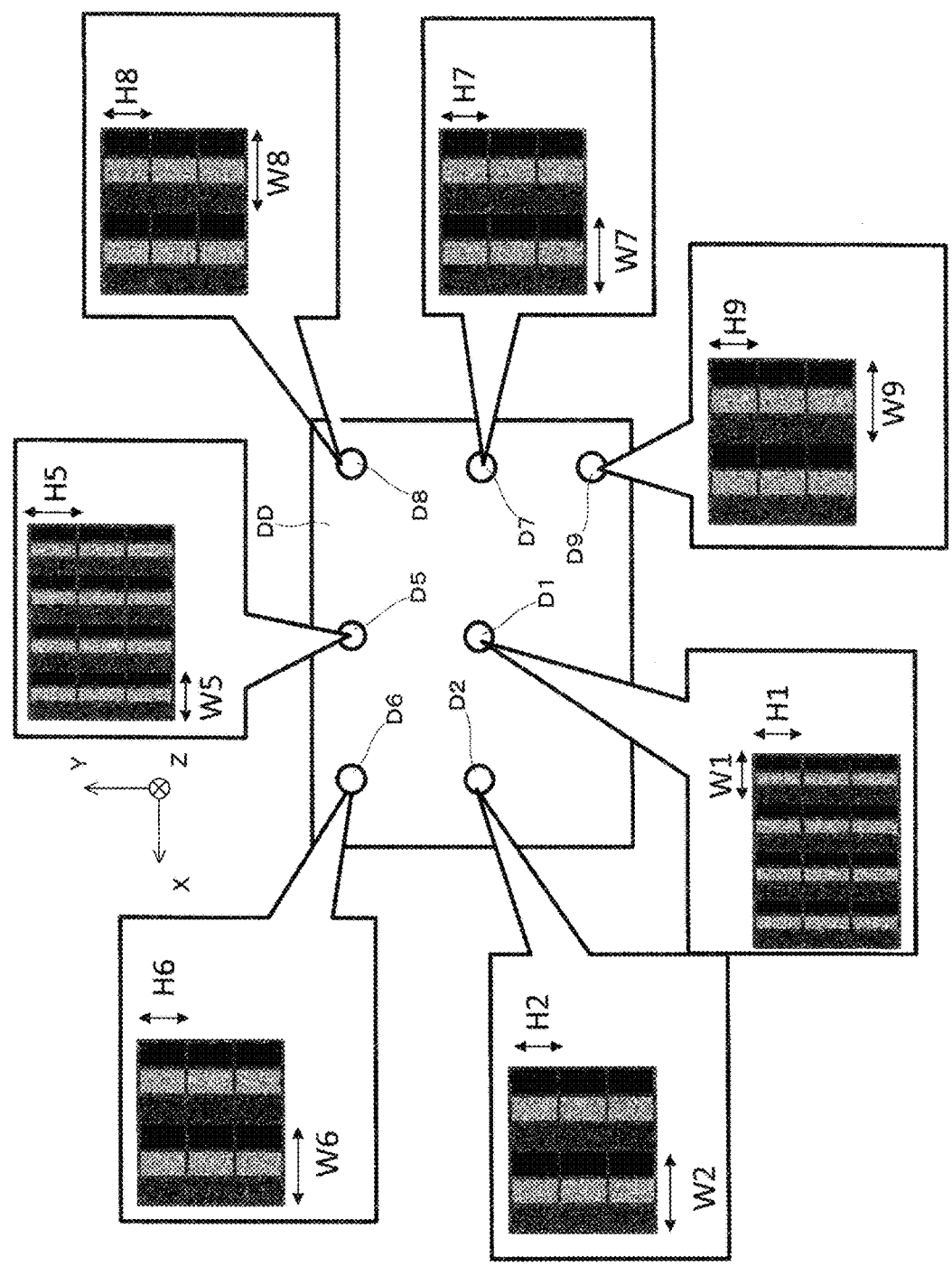
FIG. 8 illustrates the entire image display region of an image element of a virtual image display device according to Second Exemplary Embodiment.

FIG. 8 illustrates the entire image display region DD to illustrate the arrangement of pixels included in the image display unit (image element) of the virtual image display device according to Second Exemplary Embodiment, and corresponds to FIG. 4 of First Exemplary Embodiment.

In First Exemplary Embodiment, the pixels and the sub-pixels vary in their size in both the horizontal direction (the X direction) and the vertical direction (the Y direction), that is, both width and height vary. In other words, in the image display unit 10, the pixels are arranged in an arrangement, in which a pixel size varies intermittently or continuously in the horizontal direction (the left-and-right direction), and varies intermittently or continuously also in the vertical direction (the up-and-down direction) perpendicular to the horizontal direction. Thus, that configuration makes it possible to ensure an excellent visibility with a wider angle of view having been developed. In contrast, the image display unit 10 of Second Exemplary Embodiment differs from First Exemplary Embodiment in that the pixels are arranged in an arrangement, in which a pixel size varies intermittently or continuously only in the horizontal direction (the left-and-right direction), but does not vary in the vertical direction (the up-and-down direction) perpendicular to the horizontal direction to be an identical length.

An arrangement of the pixels in the image display region DD is described below with reference to FIG. 8.

The central region D1 and a region that includes the central region D1 and is relatively close to the central side include pixels having the shortest width W1 and the shortest height H1. In contrast, in the horizontal direction (the X direction), the peripheral regions D2 and D7 include pixels having the widths W2 and W7 that are longer than the width W1, and having the heights H2 and H7 that are identical to the height H1, respectively.

On the other hand, in the vertical direction (the Y direction), the peripheral region D5 includes pixels having the width W5 identical to the width W1 and the height H5 identical to the height H1. In other words, pixels have the identical size in the peripheral region D5 and in the central region D1.

In both the horizontal direction (the X direction) and the vertical direction (the Y direction), the peripheral regions D6, D8, and D9 include pixels each having widths W6, W8, and W9, which are each longer than the width W1, and the heights H6, H8, and H9, which are each identical to the height H1, respectively. In other words, the pixels have the identical size in the peripheral regions D6, D8, and D9 and in the peripheral regions D2 and D7.

Regarding other peripheral regions whose partial description is omitted above, a peripheral region on the lower side (the −Y side) in the central region D1 is like the peripheral region D5, and a peripheral region on the lower left side (the +X side and the −Y side) in the central region D1 is like the peripheral regions D6, D8, and D9.

Also in Second Exemplary Embodiment, the eyepiece optical system utilizes an non-telecentric optical system, the peripheral region on the image display of the image display unit includes pixels with a larger size than pixels in the central region and thus makes it possible to support a wide angle of view, while the central region makes it possible to retain image formation with high resolution and to prevent an image from being degraded in the peripheral region, thus making it possible to ensure high-quality visibility. In particular, in Second Exemplary Embodiment, taking into account that the effective field of view with a good performance of information capacity has a wide effective field of view in the horizontal direction corresponding to the direction of alignment of the eyes (the effective field of view with a good performance of information capacity being defined by about 30° in the horizontal direction and about 20° in the vertical direction), the size of the pixels varies in the horizontal direction, thus exerting the advantage described above. Accordingly, the size of pixels may vary only in the horizontal direction, thus making it easier to fabricate the image display unit.

In the same way, it may also possible to have a configuration such that the size of pixels may vary only in the vertical direction (up-and-down direction).

Third Exemplary Embodiment

A virtual image display device according to Third Exemplary Embodiment will be described below with reference to FIG. 9. The virtual image display device according to Third Exemplary Embodiment is almost the same as the case of First Exemplary Embodiment, except that the position of the smallest pixels, that is, a region for high resolution is different from that in First Exemplary Embodiment, and accordingly illustration and description of the entire configuration and the like are omitted.

Figure 9:
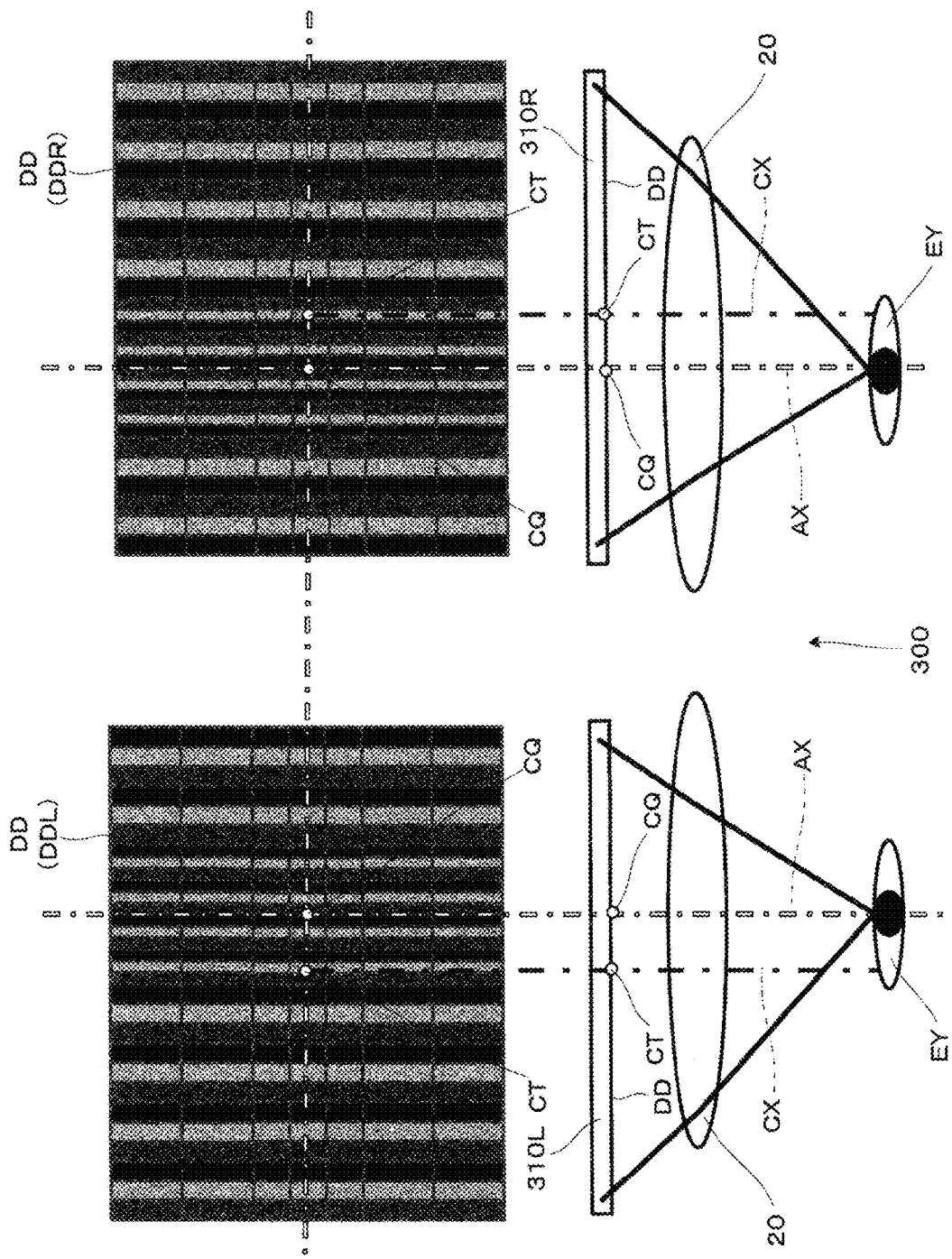
FIG. 9 illustrates an example of an image element of a virtual image display device according to Third Exemplary Embodiment.

FIG. 9 illustrates an example of an image display unit (image element) of a virtual image display device according to Third Exemplary Embodiment, and particularly is a conceptual diagram illustrating an arrangement of pixels included in the image display unit.

In First Exemplary Embodiment, the pixels of the image display unit 10 are arranged to be symmetric in size with respect to the central position CT of the image display region DD as a reference position. In contrast, a virtual image display device 300 according to Third Exemplary Embodiment exemplified in FIG. 9 differs from the case of First Exemplary Embodiment in that in image display units 310L and 310R, their pixels are arranged to be symmetric in size with respect to positions CQ and CQ shifted from central positions CT and CT of image display regions DDL and DDR in the horizontal direction corresponding to the direction of alignment of the eyes of the observer, as a reference position, respectively.

An arrangement of the pixels in the image display regions is described below with reference to FIG. 9.

FIG. 9 illustrates a pair of the image display units 310L and 310R included in the virtual image display device 300 having symmetric pair configuration according to Third Exemplary Embodiment, and also illustrates the image display regions DDL and DDR corresponding respectively to the image display units 310L and 310R. Specifically, to correspond to the left and right eyes EY and EY of the observer, an image for the left eye is displayed on the image display region DDL, and an image for the right eye is displayed on the image display region DDR. In each of the image display units 310L and 310R, in the image display region DDL for the left eye, the central position of pixels with the smallest size (most fine) is the position CQ shifted to the right from the central position CT in the horizontal direction. On the other hand, in the image display region DDR for the right eye, the central position of pixels with the smallest size is the position CQ shifted to the left from the central position CT in the horizontal direction. In contrast, a symmetric pair of the eyepiece optical systems 20 and 20 is set to be centered at the positions CQ and CQ as reference positions. In other words, the optical axes AX and AX pass through the positions CQ and CQ, respectively. Specifically, as represented by differences between the optical axes AX and AX and axes CX and CX extending in the central positions CT and CT, the optical axes AX and AX on the right side and the left side are each shifted by an identical amount from the corresponding central position CT to the corresponding position CQ in the direction opposite to each other. This arrangement makes it possible to configure the device with, for example, highest spatial resolution in the visual axis of the human eye.

Figure 10:
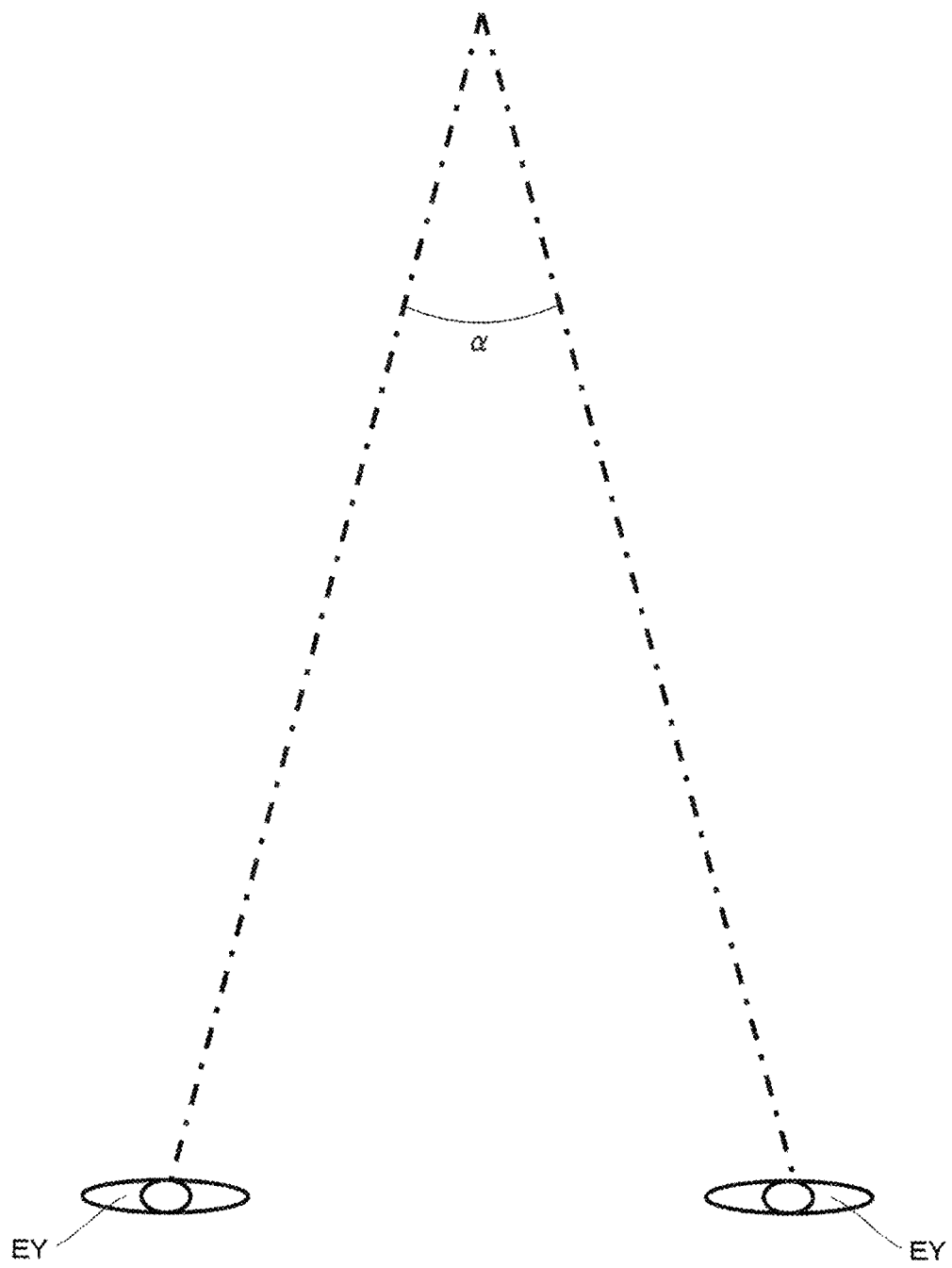
FIG. 10 illustrates an angle of convergence.

The positions CQ and CQ may be displayed as reference marks in image content to be displayed. With that configuration, the field of view on the ear side is wider than the field of view on the nose side, which makes it possible to widen the field of view of both eyes. Also with that configuration, the shift in position of displayed image between the left side and the right side may cause a parallax, and accordingly, the parallax allows the observer to recognize an image through a stereoscopic vision utilizing an angle of convergence α as represented in FIG. 10. In this case, the angle of convergence α may be determined based on a shift amount from the central position CT to the position CQ. As an example, the position CQ as a reference position is shifted in the horizontal direction to set the angle of convergence α at the eyes EY and EY of the observer to from 0° to 2°. With that configuration, for example, an angle of convergence α from 0.1° to 0.3° allows the observer to view a virtual image as if it is at a position away from the position of the observer by about 1 m. By further shifting the image with respect to the reference position in the left-and-right direction, the position of the virtual image is capable of being adjusted from the position of about 1 m in the front-and-rear direction.

Returning back to FIG. 9, in the configuration, the sub-pixels are arranged such that on the left side, red, green, and blue pixels in order from the left are arranged, and on the right side, blue, green, and red pixels in order from the left are arranged. With that configuration, panels of one type are manufactured for the image display unit, and to make a symmetric pair of them, one panel is originally disposed and the other panel is disposed after rotating by 180°, thus making it possible to use panels of the same type. In this case, as described above, the sub-pixels are different in arrangement between the left side and the right side. Thus, when different color depending on the characteristics of viewing angle of the panel is viewed, it is desirable that instead of the configuration as described above, different specific panels for the left and the right are manufactured and the sub-pixels are arranged in the same order on the left and right sides.

Also in Third Exemplary Embodiment, the eyepiece optical system utilizes an non-telecentric optical system, the peripheral region of the image display on the image display unit includes pixels with a larger size than pixels in the central region and thus makes it possible to support a wide angle of view, while the central region makes it possible to retain image formation with high resolution and to prevent an image from being degraded in the peripheral region, thus making it possible to ensure high-quality visibility. In particular, Third Exemplary Embodiment enables an image on the central side of image content to be displayed in high resolution in order to allow the observer to view a stereoscopic image with a parallax by both eyes. In the example illustrated, the pixels vary their size in the horizontal direction (left-and-right direction) and the vertical direction (up-and-down direction). However, the size of pixels may vary only in the horizontal direction (left-and-right direction). In the same way, it may be possible to have a configuration such that the size of pixels may vary only in the vertical direction (up-and-down direction).

Other Exemplary Embodiment

The disclosure is provided through some exemplary embodiments described above, but is not limited thereto. Various modifications may be made without departing from the scope of the disclosure.

In the example described above, as an eyepiece optical system, the eyepiece optical system 20 includes a single lens. However, the eyepieces optical system may include a combination of a plurality of lenses. For example, as illustrated in FIG. 11 or FIG. 12, the eyepieces optical system may have a configuration in which a light beam is partially returned.

Figure 11:
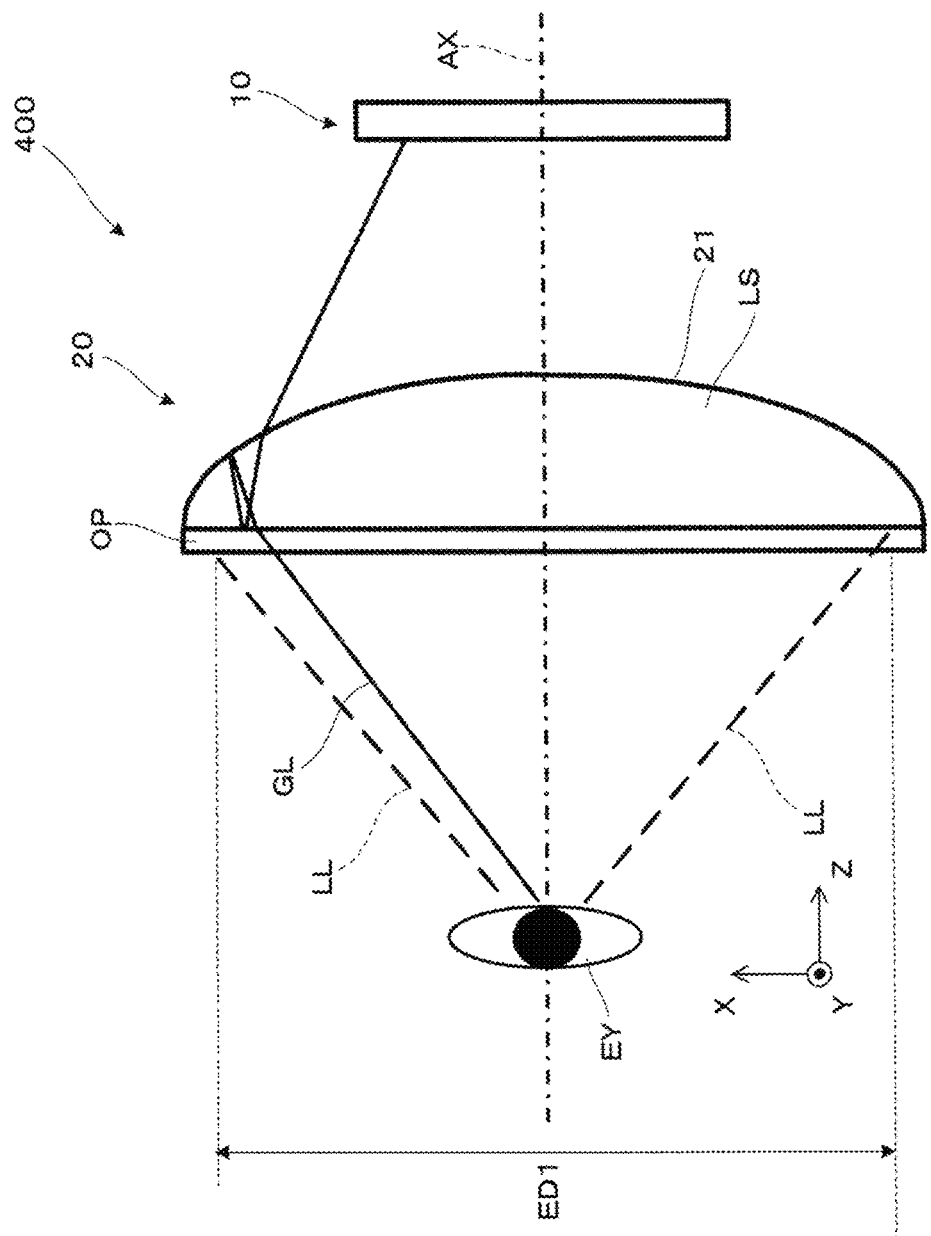
FIG. 11 conceptually illustrates a modified example of a virtual image display device.
Figure 12:
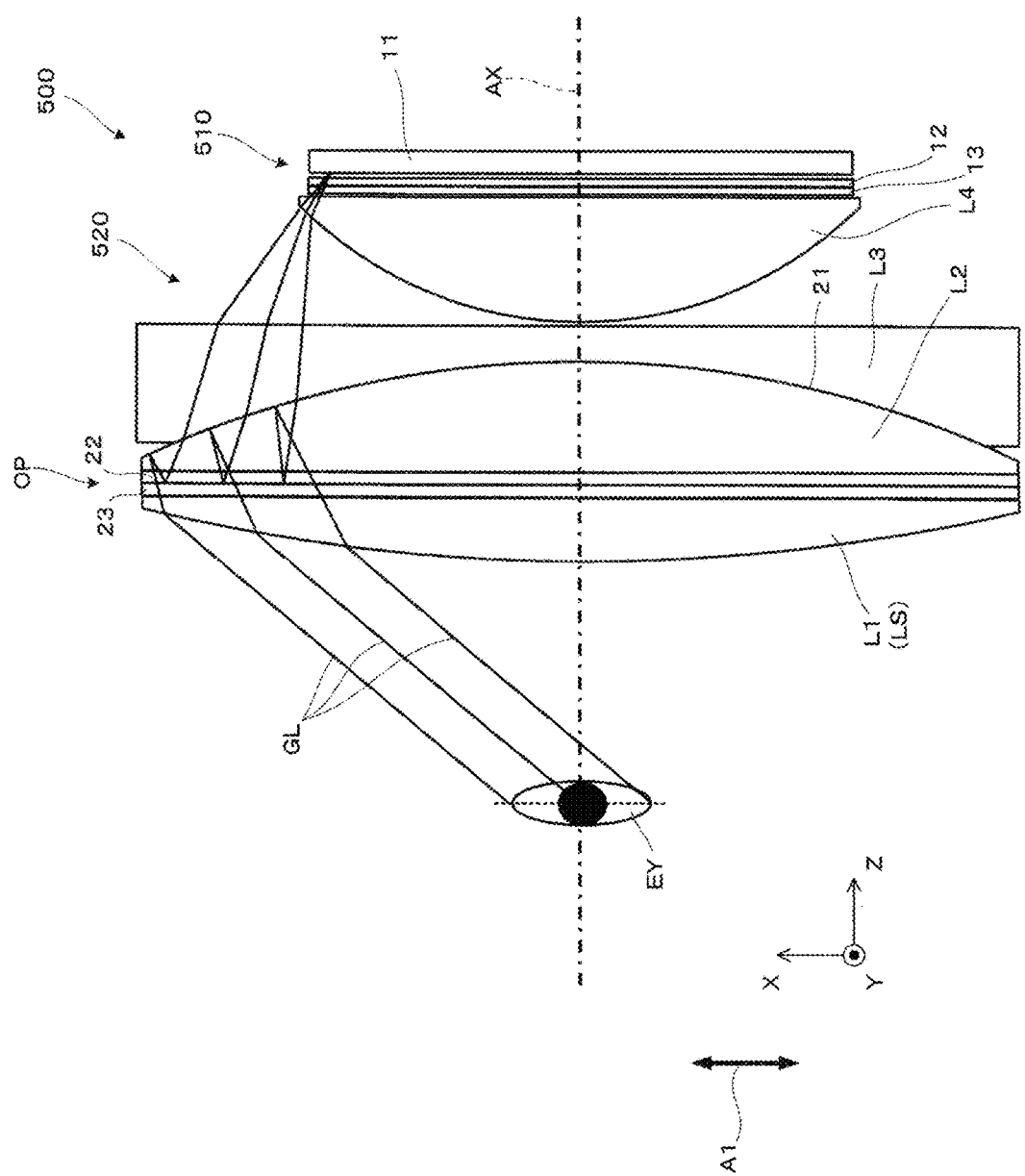
FIG. 12 conceptually illustrates another modified example of a virtual image display device.

A virtual image display device 400 illustrated in FIG. 11 includes a lens LS serving as a main element, and also a half mirror 21 and an optical element OP.

The half mirror 21 is a semi-reflective and semi-transmissive film that transmits a part of the image light GL and reflects the other part of the image light, and is formed from, for example, a dielectric multilayer. The half mirror 21 is disposed before the lens LS, that is, on the upstream side of the optical path of the image light GL, and has a concave curved shape when viewed from the observer side. In the example illustrated, the half mirror 21 is bonded to a surface on the upstream side of the optical path of the surfaces of the lens LS.

The optical element OP is a member that may be formed from, for example, a semi-reflective and semi-transmissive film, or a combination of the semi-reflective and semi-transmissive film and a semi-transmissive polarizing which is formed from a ¼ wavelength plate (a ¼ plate) or a wire-grid polarizing plate, and selectively or partially transmits and reflects the image light GL. The optical element OP is disposed after the lens LS, that is, on the downstream side of the optical path of the image light GL. In the example illustrated, the optical element OP is bonded to a surface on the downstream side of the optical path of the surfaces of the lens LS.

Next, an outline of an optical path of the image light GL is described. First, the image light GL emitted from the image display unit 10 passes through the half mirror 21, and reaches the optical element OP through the lens LS, in the eyepiece optical system 20. At the optical element OP, part of the image light GL is reflected, and reaches the half mirror 21 again. Then, a partial component of the image light GL passes through the half mirror 21, but the other component of the image light GL is reflected by the half mirror 21. The reflected component of the image light GL reaches the optical element OP through the lens LS, part of the reflected component passes through the optical element OP, and then reaches the position corresponding to the eye EY of the observer.

With that configuration, the half mirror 21 provided in an optical path in the virtual image display device 400 bends the optical path, the half mirror 21 and the optical element OP causes the light beam to travel back and forth therebetween, thus making it possible to satisfy a wide angle of view and to make the virtual image display device 400 small. Moreover, that configuration properly handles the state of the component of the image light GL to be reflected and transmitted, thus making it possible to prevent ghost light from occurring to allow the observer to view a high quality image.

A virtual image display device 500 illustrated in FIG. 12 includes an image display unit 510 and an eyepiece optical system 520.

The image display unit 510 includes a panel 11 that is a main body part for image formation, a polarizing plate 12 that extracts a component of linearly-polarized light, and a first ¼ wavelength plate (λ/4 plate) 13 that converts the component emerging from the polarizing plate 12 into circularly-polarized light to be emitted.

The panel 11 may include, for example, a self light-emitting element (OLED) such as an organic electroluminescent element. The image display unit 510 may include an image display element (image element) serving as a transmissive spatial light modulator or further include an illumination device (not illustrated) serving as a back light to illuminate the image element with illumination light and/or a drive controller (not illustrated) to control their operations.

The polarizing plate 12 converts image light to be emitted, of the light emitted from the panel 11, into linearly-polarized light. In addition, the first ¼ wavelength plate 13 converts the component emerging from the polarizing plate 12 into circularly-polarized light.

With that configuration, the image display unit 510 emits the image light GL that is circularly-polarized light.

The eyepiece optical system 520 includes four lenses, first lens L1 to fourth lens L4 that are arranged in order from the observer side, and also the half mirror 21, and the optical element OP. The optical element OP includes a polarization converting member 22 and a semi-transmissive polarizing plate 23. Of these members, except for the fourth lens L4, the first lens L1 to the third lens L3, the half mirror 21, and the optical element OP are bonded to be united as illustrated in FIG. 12. The united member illustrated here has a partially-cut shape. Of the first lens L1 to the fourth lens L4, at least the second lens L2 is preferably formed from any one of a zero-birefringence resin lens and a low-birefringence resin lens, thus making it hard to cause birefringence.

The first lens L1 is an observer lens that is disposed at a position closest to the position of the eye EY of the observer in eyepiece optical system 520. The first lens L1 serving as the observer lens is also a convex lens to collect the image light GL and emit the image light GL to the front of the eye of the observer.

The second lens L2 is disposed before the first lens L1 in their relative positions, and makes the image light GL emit from the image display unit 510 enter optical members including the first lens L1 and the like that are disposed after the second lens L2. The second lens L2 is sometimes referred to as a display lens while the first lens L1 is referred to as the observer lens. The second lens L2 is a convex lens serving as a refractor having a refractive index of, for example, 1.55 or greater, so that an image is presented at a sufficiently wide angle of view.

The third lens L3 is provided before the second lens L2, which is the display lens, and is an achromatic lens with its properties such as Abbe number adjusted as appropriate. The third lens L3 is a concave lens that is bonded to the second lens L2 to serve as an achromatic lens. In particular, the third lens L3 is bonded to the second lens L2 so that the half mirror 21 is interposed between the third lens L3 and the second lens L2. In other words, the third lens L3, which has a low Abbe number, i.e., negative power, is disposed between the half mirror 21 and the semi-transmissive polarizing plate 23, and thus color aberration is prevented from occurring.

The fourth lens L4 is a convex lens that is provided immediately after the image display unit 10, and emits the image light GL emitted from the image display unit 510 to the optical components including the third lens L3, which are disposed after the fourth lens L4. In other words, the fourth lens L4 is a front lens that is disposed at a position closest to the image display unit 510 to adjust the optical path of the image light GL, in the eyepiece optical system 520. The fourth lens L4 makes it possible to increase resolution performance and also reduce the panel size of the image display unit 510. The fourth lens L4 further makes it possible to reduce the telecentric angle of a light beam emitted from the image display unit 510, and thus luminance and chromaticity are prevented from varying depending on angles of view of the panel.

As described above, the half mirror 21 is a semi-reflective and semi-transmissive film that transmits a part of the image light and reflects the other part of the image light, and is formed from, for example, a dielectric multilayer. The half mirror 21 is also formed between the second lens L2 and the third lens L3, and has a concave curved shape, when viewed from the observer side.

In the optical element OP, the polarization converting member 22 is a member for converting the polarization state of passing light. In this example, the polarization converting member 22 is formed from a ¼ wavelength plate (a second ¼ wavelength plate or a second λ/4 plate). The polarization converting member 22 is provided between the second lens L2, which is the display lens, and the semi-transmissive polarizing plate 23 to convert the polarization state of the component traveling between the polarization converting member 22 and the half mirror 21, including the component traveling to the semi-transmissive polarizing plate 23. Specifically, the image light GL in the circular polarization state is converted into linearly-polarized light, or conversely, the image light GL in the linear polarization state is converted into circularly-polarized light.

In the optical element OP, the semi-transmissive polarizing plate 23 is a member provided between the second lens L2, which is the display lens, and the first lens L1, which is the observer lens. In this example, the semi-transmissive polarizing plate 23 is formed from a reflective wire-grid polarizing plate. In this example, a direction A1 of the polarization transmitting axis of the semi-transmissive polarizing plate 23, which is a wire-grid polarizing plate, refers to the horizontal direction (the X direction) regarded as the direction of alignment of the eyes. The semi-transmissive polarizing plate 23, which is formed from a reflective wire-grid polarizing plate, changes transmission/reflection characteristics depending on the polarization state of an incident component, and accordingly is sometimes referred to as a reflective polarizing plate.

Next, an outline of an optical path of the image light GL is illustrated. As described above, the semi-transmissive polarizing plate (or reflective polarizing plate) 23, which is formed from a wire-grid polarizing plate, has a polarization transmitting axis whose direction is the horizontal direction (the X direction). In other words, the semi-transmissive polarizing plate 23 has characteristics that transmit a polarization component in the X direction and reflects a component perpendicular to the X direction. The optical path of the image light GL illustrated in FIG. 12 is established in a plane parallel to the XZ plane. Therefore, in FIG. 12, for p-polarized light and s-polarized light, it is defined that an incident surface is parallel to the XZ plane, and a boundary surface is perpendicular to the XZ plane (i.e., parallel to the Y direction). The semi-transmissive polarizing plate 23 transmits p-polarized light and reflects s-polarized light.

In the configuration described above, the image light GL modulated by the panel 11 of the image display unit 510 and emitted is converted into p-polarized light by the polarizing plate 12, which is a transmissive wavelength plate, further converted into circularly-polarized light by the first ¼ wavelength plate 13, and then emitted to the eyepiece optical system 520. After that, in the eyepiece optical system 520, the image light GL passes through the fourth lens L4, enters the third lens L3, and then reaches the half mirror 21 formed on the boundary surface between the second lens L2 and the third lens L3. A partial component of the image light GL passes through the half mirror 21, is converted into s-polarized light by the polarization converting member 22, which is a second ¼ wavelength plate, and then reaches the semi-transmissive polarizing plate (or reflective polarizing plate) 23. The s-polarized image light GL is reflected by the semi-transmissive polarizing plate 23, again converted into circularly-polarized light by the polarization converting member 22, and then reaches the half mirror 21. While the partial component of the image light GL passes through the half mirror 21, the other component of the image light GL is reflected by the half mirror 21, and the reflected component of the image light GL is then converted into p-polarized light by the polarization converting member 22. The p-polarized component of the image light GL passes through the semi-transmissive polarizing plate 23, and then reaches the first lens L1 (the observer lens). The image light GL passes through the first lens L1, and then reaches the position that is regarded as the position of the eye EY of the observer. In this example, the half mirror 21 provided in an optical path bends the optical path, the polarization converting member 22 provided between the half mirror 21 and the semi-transmissive polarizing plate 23 properly converts the polarization state of the component traveling between the half mirror 21 and the semi-transmissive polarizing plate 23 while the virtual image display device 500 has a wide angle of view and is downsized, thus making it possible to prevent ghost light from occurring to allow the observer to view a high quality image.

Figure 13:
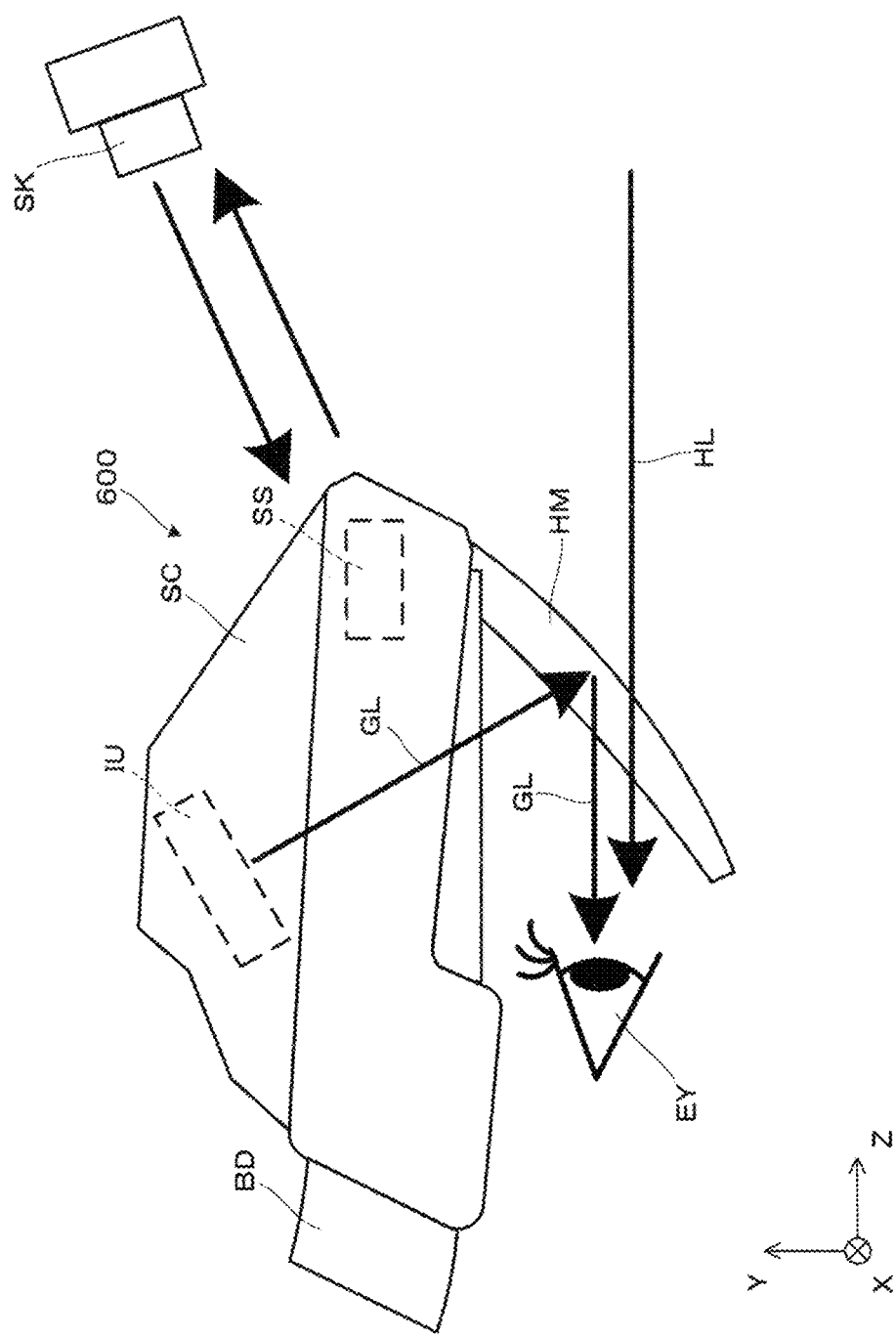
FIG. 13 conceptually illustrates still another modified example of a virtual image display device.

The technique of the disclosure is not limited to application to a closed type (not see-through) of virtual image display device, which allows the observer to view only image light, and may be applied to, for example, a see-through type that allows the observer to view or observe an outside image, as illustrated in FIG. 13.

A virtual image display device 600 illustrated in FIG. 13 includes an image forming unit IU that includes an image display unit (image element) stored in a housing SC and a part of an optical system, and a half mirror HM disposed in front of the eye EY of the observer. The virtual image display device 600 is mountable on the head of the observer through a band portion BD and the like attached to the housing SC in a state where the half mirror HM maintains a certain angle in front of the eye of the observer. A partial component of the image light GL emitted from the image forming unit IU is reflected by the half mirror HM, and thus reaches the eye EY of the observer to allow the observer to view a virtual image. Meanwhile, part of outside light HL passes through the half mirror HM, thus allowing the observer to view an outside image along with an image caused by the image light GL.

In addition to the members describes above, in the virtual image display device 600, a sensor unit SS including various sensors such as a multi-axis sensor is built. Alternatively, a sensor device SK of any type is provided outside the virtual image display device 600, such as a camera configured to acquire surrounding environmental data of the virtual image display device 600, so that the virtual image display device 600 communicates with the sensor device SK. Under such environment, the virtual image display device 600 is capable of recognizing its own position, posture, and the like to exert a head tracking function. The head tracking function itself is known, and the same function can be applied to the virtual image display devices exemplified in the other exemplary embodiment.

Other than the above application, the technique of the disclosure may be applied to a so-called video see-through product, which includes a display and an image capturing device. Furthermore, the technique of the disclosure may be applied to a hand-held type of display.

Figure 14:
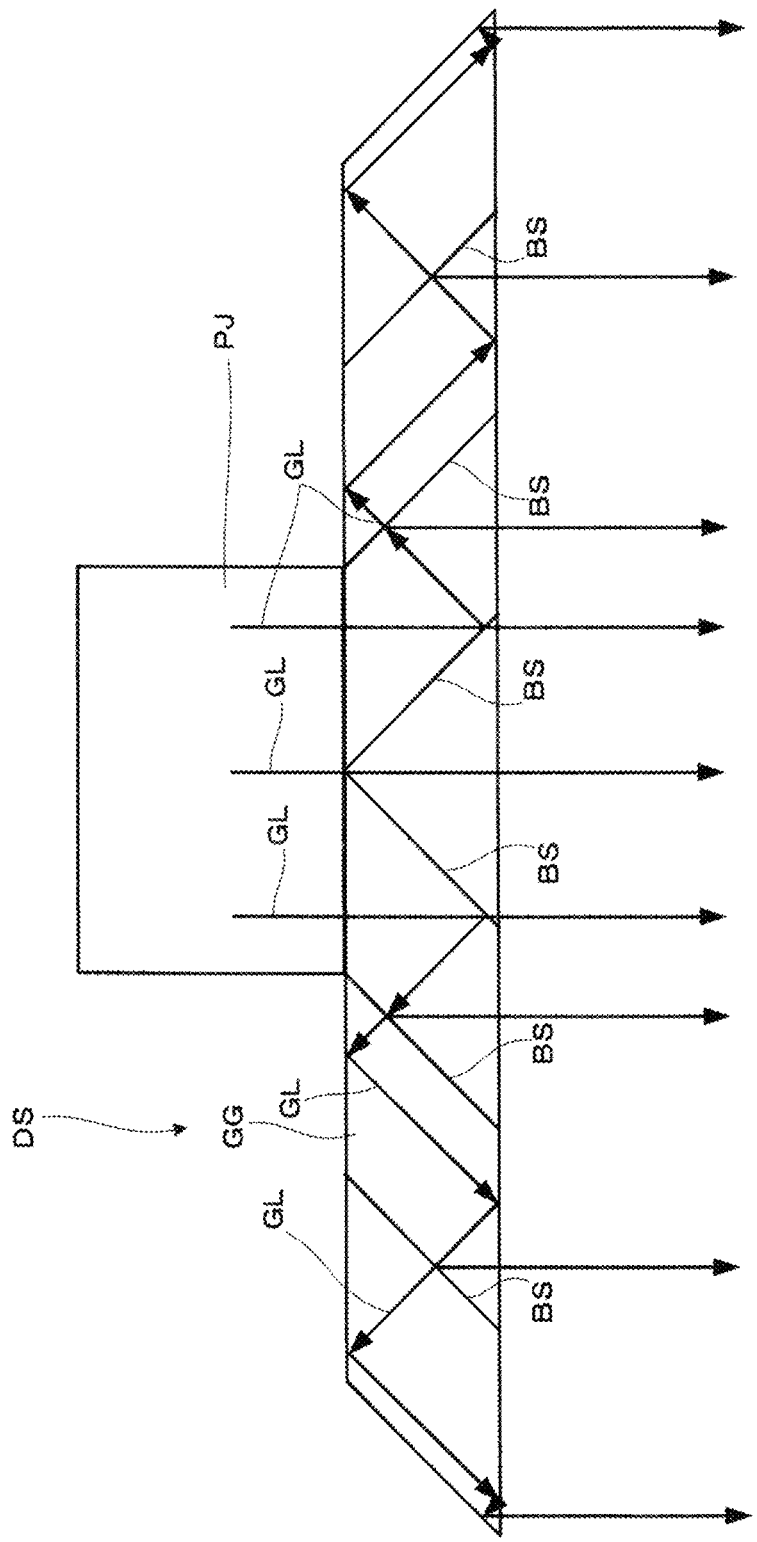
FIG. 14 conceptually illustrates yet still another modified example of a virtual image display device.

The technique of the disclosure may be applied to a device for performing image formation, such as a display device DS illustrated in FIG. 14, in which image light GL emitted from an image forming unit (projector) PJ is guided through total reflection by a light guide GG, and split by a large number of beam splitters (half mirrors) BS which are formed to be inclined with respect to the respective guide directions, to present a wide image.

Figure 15:
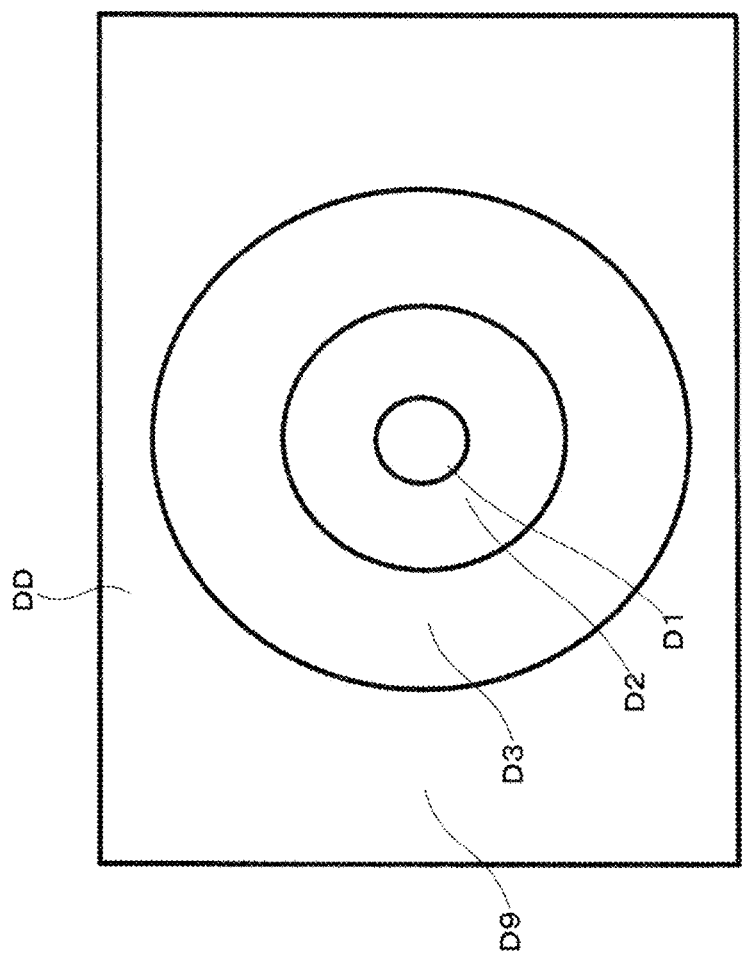
FIG. 15 conceptually illustrates yet still another modified example of a virtual image display device.

Furthermore, the pixels may be arranged in an arrangement, in which a pixel size varies but the pixels have an identical size according to a predetermined distance from a reference position in an image display region. As a specific example, as an image display region DD illustrated in FIG. 15, the respective regions D1 and others may be defined to concentrically spread. Specifically, the image display region DD may include pixels such that their size concentrically varies from a reference position (a position, such as its central position, where the highest resolution is required) on the central side of the image display region DD. With that configuration, in not only the horizontal direction (left- and right direction) and the vertical direction (up-and-down direction) perpendicular to the horizontal direction but also, for example, a diagonal direction, a wide angle of view is achieved and an excellent visibility is ensured.

Figure 16:
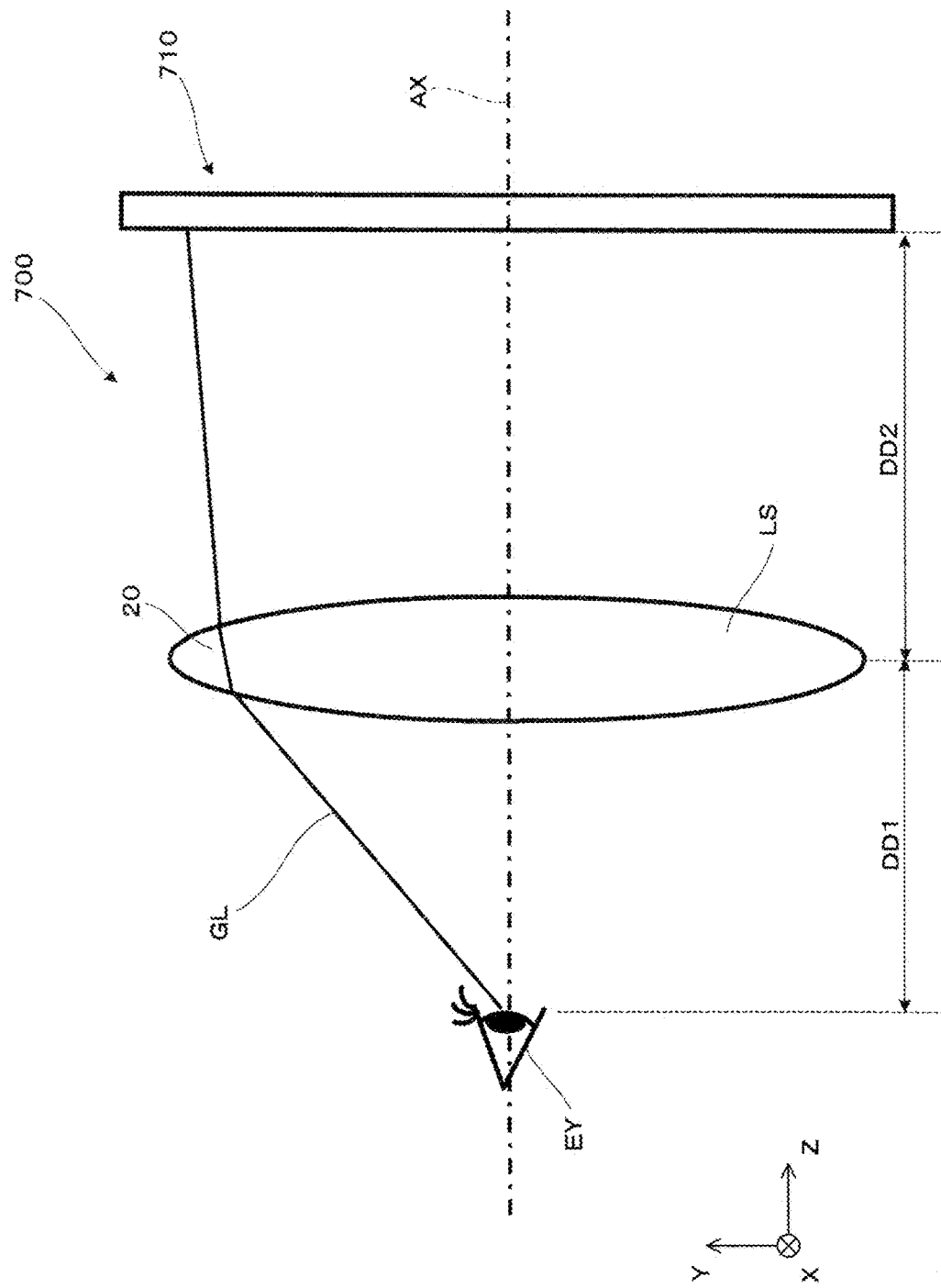
FIG. 16 conceptually illustrates yet still another modified example of a virtual image display device.

The technique of the disclosure may be applied to a device, such as a virtual image display device 700 illustrated in FIG. 16, in which an image display unit 710 including a large-sized panel (e.g., a panel of 2.5 inches or larger) is used.

Figure 17:
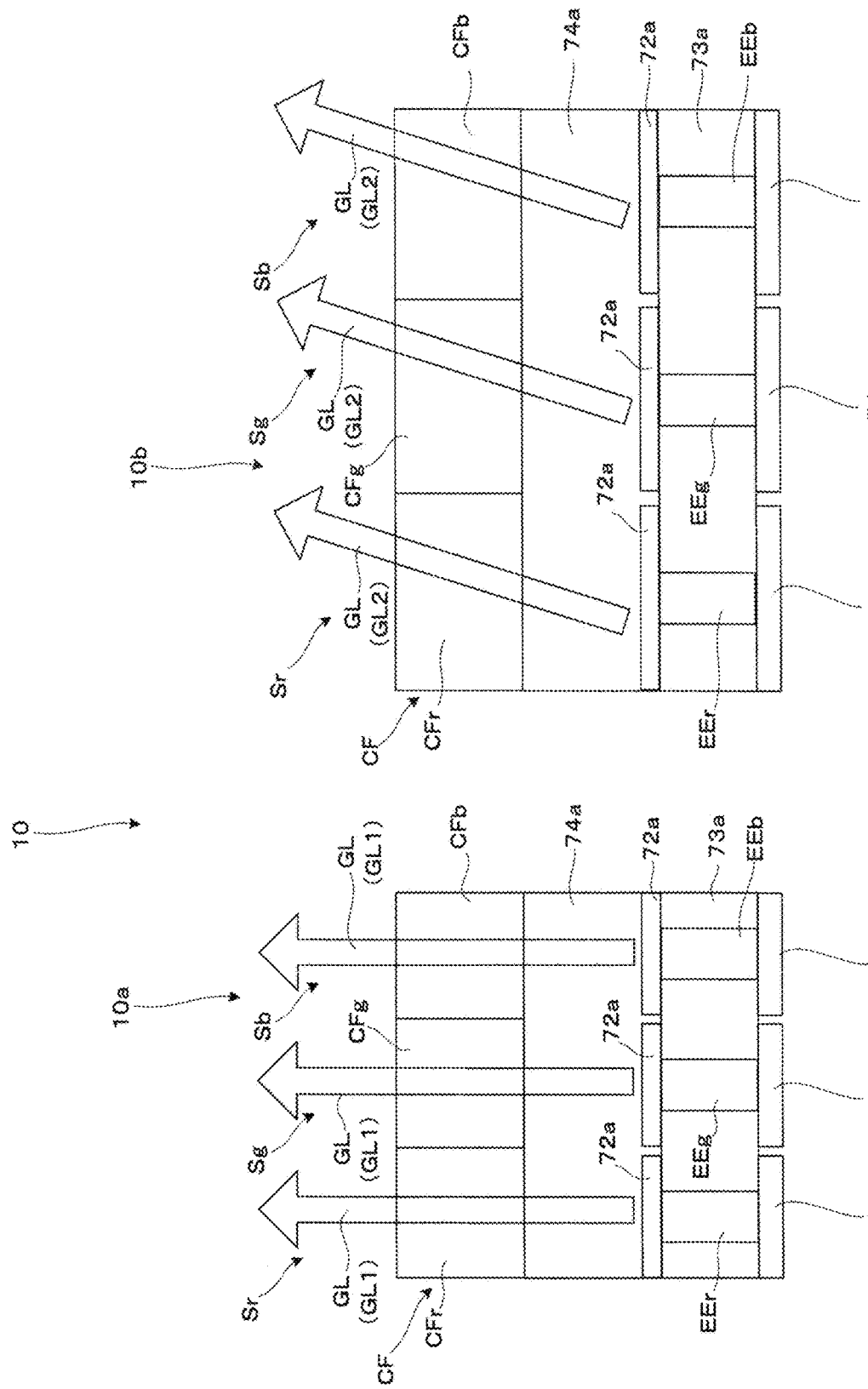
FIG. 17 conceptually illustrates emission of light beams, in a central region and a peripheral region on an image element as a modified example.

In the description of the example of the image display unit with reference to FIG. 5, the size of the light emitting layers EEr, EEg, and EEb increases as the size of pixel PX increases from the central side to the peripheral side. However, for example, as illustrated in FIG. 17, the size of the light emitting layers EEr, EEg, and EEb may have a constant size. In another view, only the size of the color filter CF may be varied. Alternatively, the size of the light emitting layers EEr, EEg, and EEb may be varied to various extents. Adjusting a luminance difference or a luminance caused by the difference in the size of the light emitting layers EEr, EEg, and EEb makes it possible to prevent, for example, a difference in lifetime characteristics caused by a difference in current density, and thus makes it hard to cause luminance unevenness over a long period of time.

As other variations, each image display unit may be a type of high temperature poly-silicon (HIPS) panel serving as a transmissive liquid display device, or any other type, such as a structure using a reflective liquid crystal display device, and a structure using a digital micromirror device in place of the image display element including the liquid crystal display device.

In the examples described above, the maximum field of view is 50° or greater, and a specific example satisfying this condition may be a field of view of 100°. As an example with a wider angle than such an angle, a field of view of 140° or greater may be applied. As a configuration having such a wide angle of view, for example, to the case exemplified in FIG. 9, an arrangement such that the position CQ, which is the center of the field of view, is away from the optical axis AX and a further adjustment of the angle of convergence α within a range from 0° to 2° may be applied.

What is claimed is:

1. A virtual image display device comprising:
an image element in which a pixel in a peripheral region on an image display has a larger size than a pixel in a central region on the image display; and
an eyepiece optical system disposed downstream of an optical path of the image element, the eyepiece optical system forming a non-telecentric system together with the image element to allow an image displayed by the image element to be viewed as a virtual image, wherein
in the image element, the pixel includes a plurality of sub-pixels, at least one of the sub-pixels constituting a pixel corresponding to at least the central region has different lengths between a vertical direction and a horizontal direction, and, in an arrangement in a direction of a side with a smaller length of the sub-pixel between the lengths of the sub-pixel in the vertical direction and the horizontal direction, the pixels being arranged in an arrangement, in which a length of the side with a smaller length of the sub-pixel increases from a central side to a peripheral side of the image element.

2. The virtual image display device according to claim 1, wherein
an optical surface of the eyepiece optical system has a larger size than an image display region of the image element.

3. The virtual image display device according to claim 1, wherein
the image element is a micro display having an image display region with a side of 2.5 inches or less.

4. The virtual image display device according to claim 1, wherein
in the image element, the pixels are arranged in an arrangement, in which a pixel size increases from a central side to a peripheral side of the image element, and a variation in the size corresponds to a variation in an emission angle of a light beam emitted from the corresponding pixel.

5. The virtual image display device according to claim 1, wherein
in the image element, the pixels are arranged in an arrangement, in which a pixel size varies intermittently or continuously in a horizontal direction corresponding to a direction of alignment of the eyes of an observer.

6. The virtual image display device according to claim 5, wherein
in the image element, the pixels are arranged in an arrangement, in which a pixel size varies intermittently or continuously in a vertical direction perpendicular to the horizontal direction.

7. The virtual image display device according to claim 6, wherein
in the image element, the pixels are arranged in an arrangement, in which a pixel size varies but the pixels have an identical pixel size according to a predetermined distance from a reference position in an image display region.

8. The virtual image display device according to claim 5, wherein
in the image element, the pixels are arranged in an arrangement, in which a pixel size does not vary in a first display region having an angle of view of at least not greater than 10° and not less than −10°, but varies in a second display region having a wider angle of view than the first display region.

9. The virtual image display device according to claim 5, wherein
in the image element, in the horizontal direction, pixels that are arranged in a single line have an identical vertical size, and, in a vertical direction perpendicular to the horizontal direction, pixels that are arranged in a single line have an identical horizontal size.

10. The virtual image display device according to claim 1, wherein
the image element includes color filter layers configured to transmit a light beam to be emitted, the color filter layers being arranged in an arrangement, in which a size increases from a central side to a peripheral side of the image element.

11. The virtual image display device according to claim 1, wherein
in the image element, the pixels are arranged to be symmetric in size with respect to a central position of an image display region as a reference position.

12. The virtual image display device according to claim 1, wherein
in the image element, the pixels are arranged to be symmetric in size with respect to a position shifted from a central position of an image display region in a horizontal direction corresponding to a direction of alignment of the eyes of an observer, as a reference position.

13. The virtual image display device according to claim 12, wherein
the reference position is shifted in the horizontal direction to set an angle of convergence at the eyes of the observer to from 0° to 2°.

14. The virtual image display device according to claim 1, wherein
the image element and the eyepiece optical system display an image with a maximum angle of view of 50° or greater.

15. The virtual image display device according to claim 1, having a head tracking function.

16. A virtual image display device comprising:
an image element in which a pixel in a peripheral region on an image display has a larger size than a pixel in a central region on the image display; and
an eyepiece optical system disposed downstream of an optical path of the image element, the eyepiece optical system forming a non-telecentric system together with the image element to allow an image displayed by the image element to be viewed as a virtual image,
wherein in the image element, the pixels are arranged to be symmetric in size with respect to a position shifted from a central position of an image display region in a horizontal direction corresponding to a direction of alignment of the eyes of an observer, as a reference position, and
the reference position is shifted in the horizontal direction to set an angle of convergence at the eyes of the observer to from 0° to 2°.

* * * * *